United States Patent
Kihara et al.

(10) Patent No.: US 8,543,786 B2
(45) Date of Patent: Sep. 24, 2013

(54) COMPUTER SYSTEM AND COMPUTER SYSTEM MANAGEMENT METHOD FOR ADDING AN UNUSED REAL VOLUME TO A POOL

(75) Inventors: Kenichi Kihara, Yokohama (JP); Masayasu Asano, Yokohama (JP); Junichi Hara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 323 days.

(21) Appl. No.: 13/054,759

(22) PCT Filed: Oct. 28, 2010

(86) PCT No.: PCT/JP2010/069222
§ 371 (c)(1), (2), (4) Date: Jan. 18, 2011

(87) PCT Pub. No.: WO2012/042678
PCT Pub. Date: Apr. 5, 2012

(65) Prior Publication Data
US 2012/0079226 A1 Mar. 29, 2012

(30) Foreign Application Priority Data
Sep. 29, 2010 (JP) .................................. 2010-218242

(51) Int. Cl.
*G06F 12/00* (2006.01)
(52) U.S. Cl.
USPC ............................. 711/165; 711/170; 711/171
(58) Field of Classification Search
USPC ......................................... 711/165, 170, 171
See application file for complete search history.

(56) References Cited

U.S. PATENT DOCUMENTS

| | | | |
|---|---|---|---|
| 6,253,295 B1* | 6/2001 | Beal et al. ...................... | 711/162 |
| 7,613,896 B2* | 11/2009 | Yamamoto et al. .......... | 711/171 |
| 2005/0060506 A1* | 3/2005 | Higaki et al. ................. | 711/162 |
| 2005/0216663 A1 | 9/2005 | Fujibayashi | |
| 2005/0228945 A1* | 10/2005 | Nagata .......................... | 711/114 |
| 2007/0130423 A1* | 6/2007 | Liu et al. ....................... | 711/114 |
| 2007/0168634 A1 | 7/2007 | Morishita et al. | |
| 2007/0239954 A1* | 10/2007 | Sakashita et al. ............. | 711/165 |
| 2007/0245116 A1* | 10/2007 | Yamamoto et al. .......... | 711/172 |

(Continued)

FOREIGN PATENT DOCUMENTS

| | | |
|---|---|---|
| JP | 2005-275829 | 10/2005 |
| JP | 2007-193573 | 8/2007 |
| JP | 2010-086424 | 4/2010 |

OTHER PUBLICATIONS

PCT Search Report and Written Opinion on application No. PCT/JP2010/069222 dated Feb. 1, 2011; 6 pages.

*Primary Examiner* — John Lane
(74) *Attorney, Agent, or Firm* — Foley & Lardner LLP

(57) ABSTRACT

A computer system of the present invention selects and executes an appropriate action in a case where capacity of a pool that provides a real storage area to a virtual logical volume is insufficient. A management computer determines, based on a utilization status of each pool, whether or not there exists a prescribed pool that requires pool size expansion. The management computer, in a case where the prescribed pool is detected, selects at least any one of a volume addition method for adding an unused real volume to the prescribed pool and a data migration method for migrating data of the virtual logical volume to another pool other than the prescribed pool, and expands a pool size of the prescribed pool in accordance with the selected method.

12 Claims, 14 Drawing Sheets

(56) References Cited

U.S. PATENT DOCUMENTS

| | | |
|---|---|---|
| 2010/0082900 A1 | 4/2010 | Murayama et al. |
| 2010/0235573 A1* | 9/2010 | Asano et al. ................. 711/114 |
| 2011/0066823 A1* | 3/2011 | Ando et al. ................... 711/171 |
| 2011/0185135 A1* | 7/2011 | Fujii et al. .................... 711/162 |
| 2011/0258412 A1* | 10/2011 | Asano et al. .................. 711/165 |
| 2011/0264868 A1* | 10/2011 | Takata et al. ................. 711/154 |

* cited by examiner

FIG. 3

| VVOL# | AP# | POOL# | USED SIZE | APPLICATION OPERATING PERIOD | MIGRATION FUNCTION | CATEGORY |
|---|---|---|---|---|---|---|
| VVOL-A | AP-A | POOL-A | 42TB | 24h | NO | A |
| VVOL-B | AP-B | POOL-A | 54TB | 24h | YES (NONSTOP I/O) | A,B |
| VVOL-C | AP-C | POOL-B | 30TB | 08:00-18:00 | NO | B,C |
| VVOL-D | AP-D | POOL-B | 60TB | 24h | YES (NONSTOP I/O) | B |
| VVOL-E | AP-E | POOL-C | 60TB | 08:00-20:00 | NO | C |

HOST-VOLUME INFORMATION 212

| | | 213 |
|---|---|---|
| STORAGE INFORMATION | | |
| 2131 | 2132 | 2133 |
| STORAGE # | MIGRATION FUNCTION | EXTERNAL CONNECTION FUNCTION |
| DKC-A | NO | YES |
| DKC-B | YES (STOP I/O) | YES |
| DKC-C | YES (STOP I/O) | NO |
| DKC-D | NO | NO |

FIG. 5

| POOL INFORMATION | | | |
|---|---|---|---|
| 2141 | 2142 | 2143 | 2144 |
| POOL # | POOL SIZE | USAGE | CATEGORY |
| POOL-A | 120TB | 35% | A |
| POOL-B | 120TB | 70% | A,B |
| POOL-C | 120TB | 50% | B,C |
| POOL-D | 200TB | 30% | C |

| UNUSED VOLUME INFORMATION | | | | 215 |
|---|---|---|---|---|
| UNUSED VOLUME # /2151 | STORAGE # /2152 | SIZE /2153 | CATEGORY /2154 |
| UVOL-A | DKC-A | 40TB | A |
| UVOL-B | DKC-B | 50TB | B |
| UVOL-C | DKC-D | 20TB | A |

FIG. 7

MANAGEMENT VOLUME INFORMATION 216

| POLICY # 2161 | COVERAGE 2162 | START CONDITION 2163 | ACTION 2164 | SUCCESS CONDITION 2165 |
|---|---|---|---|---|
| POLICY 001 | ALL POOLS | 70 TO 84% POOL USAGE | EXPAND POOL SIZE | MAKE POOL USAGE 40 TO 60% |
| POLICY 002 | ALL POOLS | EQUAL TO OR GREATER THAN 85% POOL USAGE | EXPAND POOL SIZE | MAKE POOL USAGE EQUAL TO OR LESS THAN 80% |
| POLICY 003 | POOL-C | EQUAL TO OR GREATER THAN 65% POOL USAGE | ALERT | — |

US 8,543,786 B2

COMPUTER SYSTEM AND COMPUTER SYSTEM MANAGEMENT METHOD FOR ADDING AN UNUSED REAL VOLUME TO A POOL

CROSS-REFERENCE TO RELATED PATENT APPLICATIONS

This application is a U.S. National Phase application of application no. PCT/JP2010/069222 filed Oct. 28, 2010 and claims priority from Japan Priority Application 2010-218242, filed Sep. 29, 2010. All of the aforesaid applications are incorporated herein by reference in their entirety as if fully set forth herein.

TECHNICAL FIELD

The present invention relates to a computer system and a computer system management method.

BACKGROUND ART

A large-scale storage is also called a storage subsystem, and in addition to making high-speed, large-capacity data storage possible, also comprises advanced data management functions. Multiple physical storage devices, such as hard disk drives, are mounted inside the storage. A logical volume, which is a logical storage area, is configured using the storage area inside these storage devices. A storage apparatus provides the logical volume to a host computer. The host computer reads and writes data with respect to the logical volume.

In recent years, thin provisioning technology, which enhances the capacity efficiency of the logical volume, has been proposed. Thin provisioning technology provides the host with a virtual logical volume (hereinafter, a virtual volume) instead of a conventional logical volume.

A conventional logical volume requires a physical storage area (a real storage area) of a size specified at volume creation. By contrast, in the case of a virtual volume, a real storage area for storing this data is fetched from a pool and allocated to the virtual volume at the point in time at which an actual data write has occurred. When thin provisioning technology is used, there is no need to allocate a real storage area to the virtual volume until the data write actually occurs, making it possible to conserve the real storage area.

However, depending on the state of the data write to a virtual volume, there could be a case in which the amount of data being written to the virtual volume exceeds the size of the real storage area capable of being allocated to the virtual volume. An error can occur when the real storage area to be allocated to the virtual volume is insufficient.

For this reason, when using thin provisioning technology, it is desirable that the size (the actual amount used) of the real storage area capable of being allocated to the virtual volume be precisely managed.

In a first prior art, in a case where there is a capacity shortage in a pool, the size of the pool is expanded by adding a usable volume to the pool (Patent Literature 1). In a second prior art, a capacity shortage in a migration-source pool is resolved by migrating a virtual volume that is using the pool to another pool (Patent Literature 2).

CITATION LIST

Patent Literature

[PTL 1]
Japanese Patent Application Laid-open No. 2007-193573

[PTL 2]
Japanese Patent Application Laid-open No. 2010-86424

SUMMARY OF INVENTION

Technical Problem

The two methods mentioned above are known as ways for dealing with a case in which the pool size is insufficient. However, the computer system configuration is complex, and, in addition, since the status changes, the user, who is the administrator of the computer system, has difficulty selecting which action to take.

In a heterogeneous computer system in which multiple different types of storages are intermixed, numerous elements must be taken into consideration, making it more difficult to select an appropriate action. In particular, in the case of an inexperienced, unknowledgeable user who does not have a criterion to rely on, the selection of an action is even more difficult.

Accordingly, an object of the present invention is to provide a computer system and a computer system management method that make it possible to reduce the burden on the administrator and expand the size of a pool by selecting and executing at least one method from among multiple methods based on a prescribed selection criterion.

Solution to Problem

To solve the above problem, a computer system according to the present invention includes: multiple storage control apparatuses that create at least one virtual logical volume; at least one host computer that uses the virtual logical volume; and at least one management computer for managing the respective storage control apparatuses and the host computer. Each of the storage control apparatuses is configured to allocate a real storage area of a real volume inside a pool to the virtual logical volume in response to a write access from the host computer, and to store write data received from the host computer in the allocated real storage area. The management computer includes a microprocessor, a memory for storing a prescribed computer program that is read and executed by the microprocessor, and a communication interface part for communicating with the respective storage control apparatuses and the host computer. The microprocessor, by reading and executing the prescribed computer program, acquires a utilization status of each of the pools, determines, based on the acquired utilization status of each of the pools, whether or not there exists a prescribed pool that requires pool size expansion, and in a case where the prescribed pool is detected, selects, based on a prescribed selection criterion, at least any one of (A) a volume addition method for adding an unused real volume to the prescribed pool, and (B) a data migration method for migrating data of the virtual logical volume to another pool other than the prescribed pool, and expands a pool size of the prescribed pool in accordance with the selected method.

The microprocessor, in a case where either the volume addition method or the data migration method is to be selected, may take into account an operational status of an application program that uses the virtual logical volume to make a determination as to whether or not the pool size expansion of the prescribed pool is completed within a prescribed time.

The volume addition method may include a first volume addition method, which adds an unused first real volume of a prescribed storage control apparatus to which the prescribed pool belongs from among the respective storage control apparatuses to the prescribed pool.

The microprocessor may take into account, as the prescribed selection criteria in a case where the first volume addition method is to be executed, a volume size of the first real volume, a state of compatibility between an attribute label that is preconfigured with respect to the prescribed pool and an attribute label that is preconfigured with respect to the first real volume, and response performance of the prescribed pool in a case where the first real volume is added to the prescribed pool.

The volume addition method may include a second volume addition method, which adds an unused second real volume to the prescribed pool by connecting the unused second real volume of another storage control apparatus other than the prescribed storage control apparatus from among the respective storage apparatuses to the prescribed storage pool.

The volume addition method may include a third volume addition method, which removes a third real volume that is disposed in a first another pool of the prescribed storage control apparatus from among the respective storage control apparatuses, and adds this removed third real volume to the prescribed pool as an unused real volume.

The volume addition method may include a fourth volume addition method, which removes a fourth real volume that is disposed in a second another pool of the other storage control apparatus other than the prescribed storage control apparatus, and adds this removed fourth real volume to the prescribed pool as an unused real volume.

The data migration method may include a first data migration method, in which the host computer migrates the data of the virtual logical volume to the other pool other than the prescribed pool.

The data migration method may include a second data migration method, in which the prescribed storage control apparatus migrates the data of the virtual logical volume to the other pool other than the prescribed pool.

The present invention can also be understood as either a computer program or a recording media for recording a computer program. In addition, the present invention is not limited to the combinations of the respective aspects described above, and can comprises combinations other than these.

BRIEF DESCRIPTION OF DRAWINGS

FIG. 3 is a diagram showing information of a virtual volume that is used by a host.

FIG. 4 is a diagram showing storage information.

FIG. 5 is a diagram showing pool information.

FIG. 6 is a diagram showing unused volume information.

FIG. 7 is a diagram showing management policy information.

DESCRIPTION OF EMBODIMENTS

Figure 1:
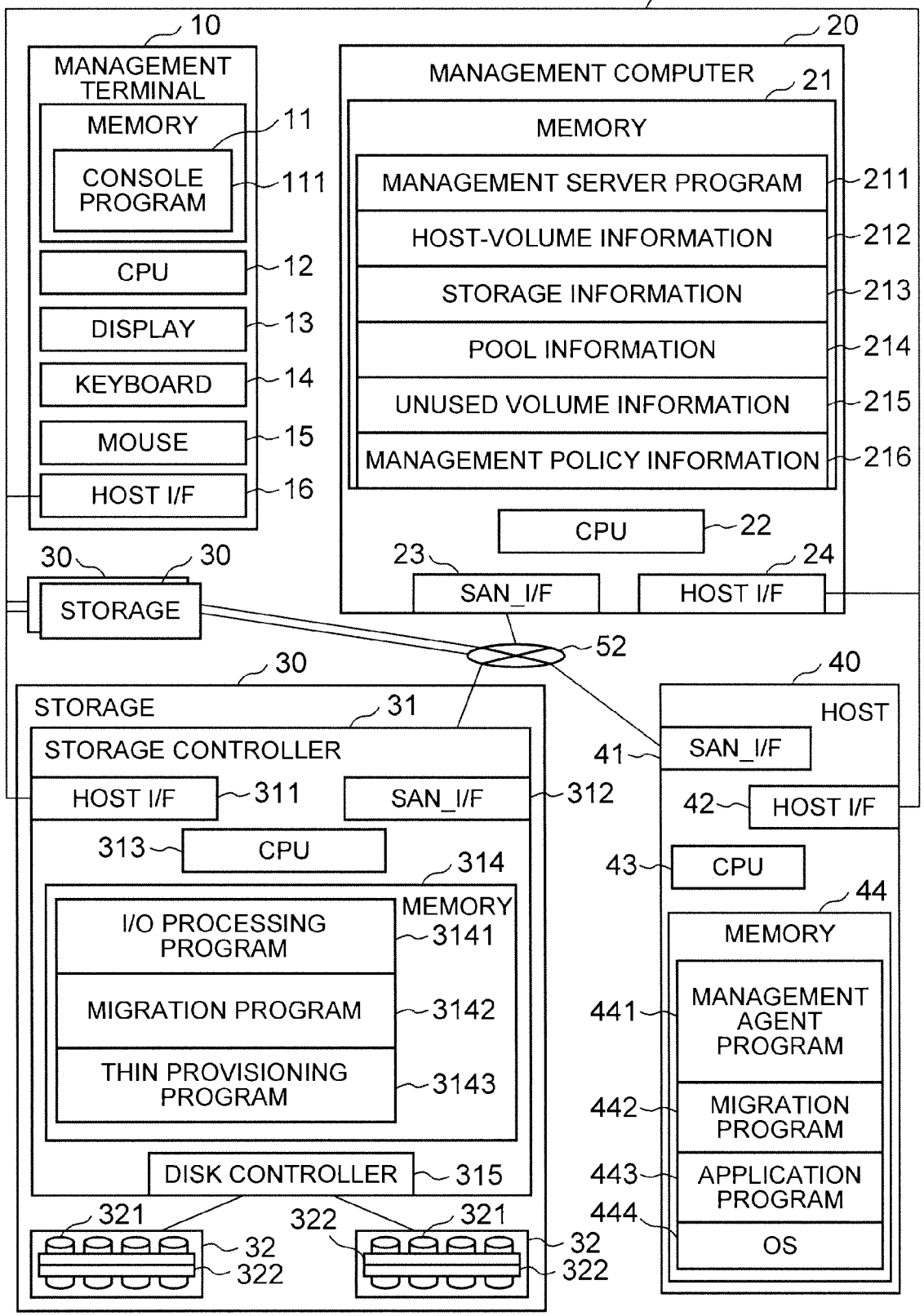
FIG. 1 is a block diagram of an entire computer system related to this embodiment.

The aspects of the embodiment of the present invention will be explained below based on the drawings. In this embodiment, as will be explained further below, in a case where the size of a pool is insufficient, a method for selecting an action for solving this capacity shortage is presented.

The action, for example, may be selected based on the following aspects.

(Aspect 1) Considerations for the Environment in which Different Types of Host Computers and Different Types of Storages are Intermixed Action functions (for example, a function for expanding a pool and a function for migrating a virtual volume) of the respective host computers and the respective storages included in a computer system are not necessarily the same. Therefore, the management computer selects an action after discerning the presence or absence of an action function and a precondition.

(Aspect 2) Considerations Related to Urgency of Action and the Time Required for the Action This Aspect 2 reduces the risk that can occur when an action requiring a long period of time is selected and implemented. The risk is that the pool size will not be expanded in time and the pool size will be depleted. For example, caution is needed in a case where the action for migrating a virtual volume to another pool is selected during a period when an application program is not being operated. In a case where the application program begins to operate before the virtual volume migration has been completed, the pool size could possibly become depleted. Alternatively, the shorter the required time the better is not always the case with respect to an action. Selecting an action with an unduly short turnaround time could decrease flexibility of action selection and adversely affect usability.

(Aspect 3) Considerations Related to the Rationalization of Pool Usage

Even though a certain measure has been implemented, pool usage remains high and the capacity shortage is not resolved. That is, an action that is effective at lowering pool usage must be implemented. However, an operation that lowers pool usage unduly could incur storage size overspending.

(Aspect 4) Considerations Related to the Attributes of a Volume and a Pool

A virtual volume, a real volume (a logical volume) and a pool each comprises attributes (for example, performance, costs, assigned section, and so forth) corresponding to either configuration or purpose. Ignoring these attributes when migrating a virtual volume to another pool or freely adding a real volume to a pool could reduce usability. For example, there may be cases in which a virtual volume for which high-speed response is required is migrated to a pool with low response performance, or a virtual volume for which high reliability is required is migrated to a low-reliability pool. In addition, for example, adding a low-speed logical volume to a pool comprising high-speed logical volumes will lower the response performance of this pool. Consequently, an attribute label (will be called a "category" in the examples described hereinbelow) is configured for a virtual volume, a logical volume and a pool, and an action is selected in conformance with the attribute label.

(Aspect 5) Considerations Related to Changes in Performance before and after Executing an Action When an action is executed, the performance of a virtual volume or the performance of a pool will change. Preventing the performance of the virtual volume or the performance of the pool from falling below an allowable range before and after action execution is taken into account when selecting an action.

Example 1

The aspects for putting the present invention into practice will be described below in accordance with the drawings. FIG. 1 is a block diagram of an entire computer system related to this embodiment. The computer system, for example, comprises at least one management terminal 10, at least one management computer 20, multiple storages 30, at least one host computer 40, a management network 51, and a storage network 52.

The management terminal 10, management computer 20, respective storages 30, and host computer 40 are connected via the management network 51 so as to be enable two-way communications. In addition, the management computer 20, respective storages 30, and host computer 40 are coupled via the storage network 52 so as to be enable two-way communications.

The management network 51 and the storage network 52 are communication lines, and are communication paths for sending and receiving data between respective information processing apparatuses. Furthermore, in FIG. 1, the management network 51 and the storage network 52 are depicted as separate communication lines, but the two networks 51, 52 may be configured as a common communication line.

The management terminal 10 is an information processing apparatus, and, for example, comprises a memory 11, a microprocessor (CPU in the drawing) 12, a display device 13, a keyboard 14, a mouse 15, and a host interface (hereinafter, interface will be expressed as I/F) 16.

The memory 11 stores data and a computer program. The microprocessor (hereinafter, the processor) 12 reads and executes the computer program from the memory 11. The display device 13 displays data and the like. The keyboard 14 receives character-based input from a user. The mouse 15 is used for indicating an arbitrary point on a screen being displayed on the display device. The host I/F 16 sends and receives data to and from the management computer 20 via the management network 51. Furthermore, the user interfaces are not limited to a display device, a keyboard, and a mouse, but rather a vocal indicating device and a brainwave indicating device can also be used as user interfaces.

A console program 111 is stored in the memory 11. The execution of the console program 111 by the processor 12 realizes a function for exchanging data with the management computer 20 via the host I/F 16 and the management network 51, a function for displaying information on the display device 13, and a function for receiving input from the user via the keyboard 14 and the mouse 15.

The management terminal 10 is used by a user (a storage administrator), who is involved in the operation and management of storage, as an access point for operating and managing the storage 30.

The management computer 20 is an information processing apparatus, and, for example, comprises a memory 21, a processor 22, a SAN I/F 23, and a host I/F 24.

The memory 21 stores data and a computer program. The processor 22 reads and executes the computer program from the memory 21. Respective functions, which will be described further below, are realized in accordance with this. The SAN I/F 23 is a circuit for carrying out operating instructions or information queries and the like with respect to the respective storages 30 via the storage network 52. The host I/F 24 is a circuit for carrying out data communications with the other information processing apparatuses 10, 30, 40 via the management network 51.

A management server program 211 is a computer program for managing the respective storages 30 and is stored in the memory 21. Host volume information 212 is information for managing the configuration and utilization of a virtual volume that is being used on the host computer 40. Storage information 213 is information for managing functions built into the respective storages 30. Pool information 214 is information for managing the configuration and utilization of respective pools. Unused volume information 215 is information related to unused volumes inside the respective storages 30. Management policy information 216 is information for defining the operation of the management server program 211.

The host volume information 212, the storage information 213, the pool information 214, the unused volume information 215, and the management policy information 216 are stored in the memory 21. This information 212, 213, 214, 215, 216 will be described in detail further below.

Furthermore, in FIG. 1, a case in which the management computer 20 and the host computer 40 are configured separately is shown, but instead of this, the management computer functions may be realized via the host computer 40. For example, the configuration may be such that the computer program 211 and various types of information 212 to 216 of the management computer 20 are disposed in at least one host computer 40 of the multiple host computers 40.

Each storage 30 serves as the "storage control apparatus", and is an apparatus for storing information. Each storage 30, for example, comprises a storage controller 31 and a disk unit 32.

The storage controller 31 comprises a host I/F 311, a SAN I/F 312, a microprocessor 313, a memory 314, and a disk controller 315. The host I/F 311 is a circuit for coupling to the management network 51. The SAN I/F 312 is a circuit for coupling to the storage network 52.

The memory 314, for example, stores an input/output processing program (I/O program in the drawing) 3141, a volume migration program (migration program in the drawing) 3142, and a thin provisioning program 3143. The microprocessor 313 reads and executes these computer programs 3141, 3142, 3143. The disk controller 315 controls the reading and writing of data with respect to the disk drives 321.

A disk unit 32 comprises multiple disk drives 321. The physical storage areas of each disk drive 321 can be grouped together, and multiple logical storage areas can be configured on these grouped physical storage areas. This logical storage area is called a logical volume 322.

For example, various devices capable of reading and writing data, such as a hard disk drive, a semiconductor memory drive, an optical disk drive, and a magneto-optical disk drive can be used as the disk drive.

In a case where a hard disk drive is used, for example, FC (Fibre Channel) disks, SCSI (Small Computer System Interface) disks, SATA disks, ATA (AT Attachment) disks, SAS (Serial Attached SCSI) disks and the like can be used. Further, for example, various storage devices, such as flash memory, FeRAM (Ferroelectric Random Access Memory), MRAM (Magnetoresistive Random Access Memory), Ovonic Unified Memory, RRAM (Resistance RAM) can also be used.

The input/output processing program 3141 defines a logical volume in accordance with a request from the management computer 20. In addition, the input/output processing program 3141 reads and writes data with respect to a logical volume and a virtual volume in accordance with a request from the host computer 40.

The volume migration program 3142 migrates a virtual volume to another pool in accordance with an instruction from the management computer 20. Explanations of the virtual volume and the pool will be provided further below using FIG. 2.

The thin provisioning program 3143, for example, provides functions for managing the configuration of a pool, managing the operation of the pool, managing the configuration of a virtual volume, managing the operation of the virtual volume, and reading/writing data.

The host computer 40 is an information processing apparatus, and, for example, comprises a SAN I/F 41, a host I/F 42, a processor 43, and a memory 44.

The SAN I/F 41 is a circuit for communicating data with the respective storages 30 via the storage network 52. The host I/F 42 is a circuit for communicating data with the management computer 20 via the management network 51.

The memory 44, for example, stores a management agent program 441, a migration program (also called the volume migration program) 442, an application program 443, and an OS (Operating System) 444. The processor 43 reads and executes the respective computer programs 441, 442, 443.

The management agent program 441 executes the volume migration program 442 based on an instruction from the management server program 211.

The volume migration program 442 moves the data of either a logical volume or a virtual volume to another logical volume or another virtual volume.

The application program 443 is for executing business processes on the host computer 40.

The OS 444 is basic software that constitutes the basis for executing the management agent program 441 and the application program 443.

Figure 2:
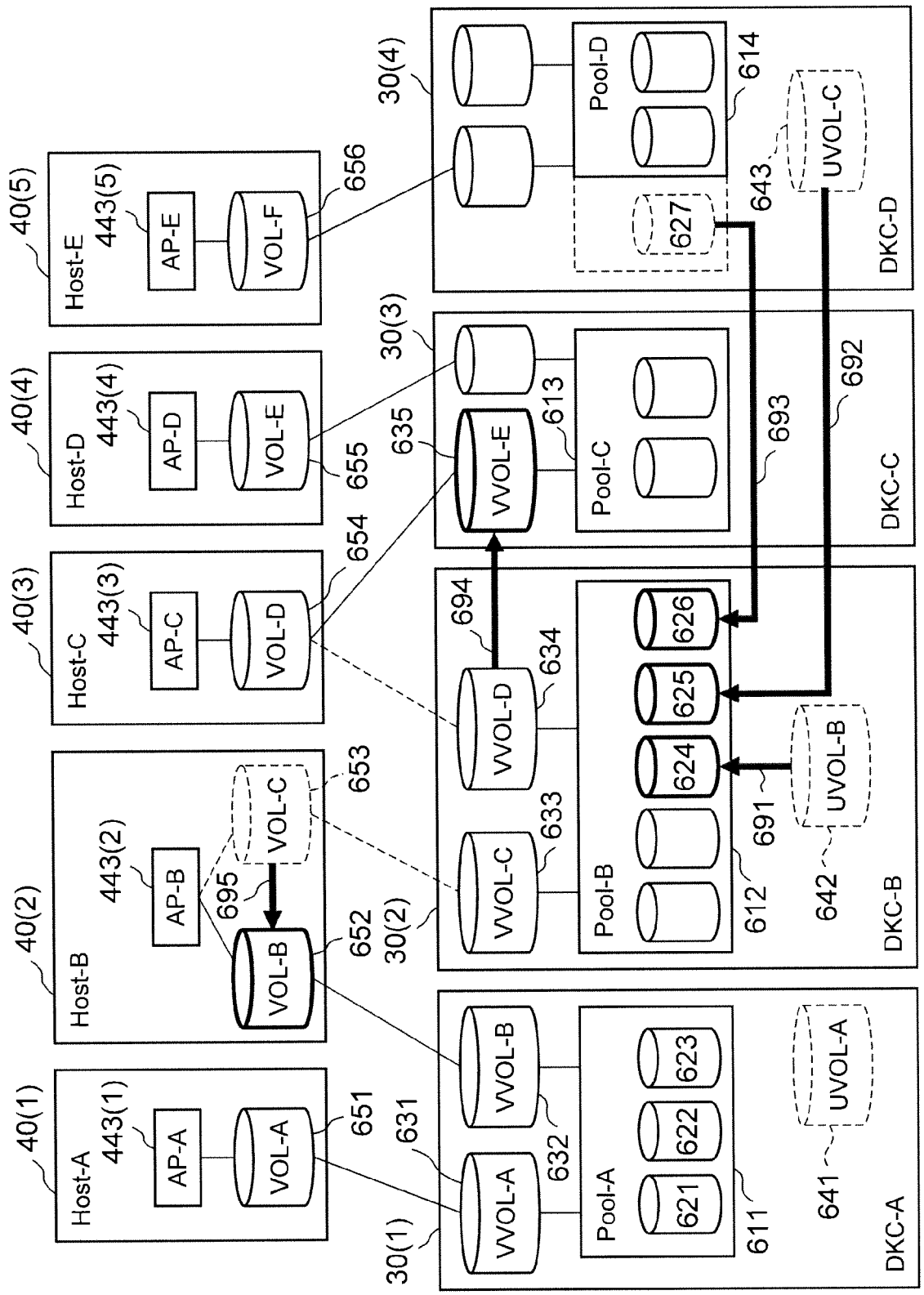
FIG. 2 is a schematic diagram showing a pool size expansion method.

FIG. 2 is a conceptual diagram showing the logical configuration of an information processing system that uses thin provisioning technology and actions for dealing with a shortage of pool capacity.

First of all, a pool and a virtual volume in thin provisioning technology will be explained. The storage 30 (1) is identified by the identifier "DKC-A". A pool 611 that is identified by the identifier "POOL-A" is included inside the storage 30 (1).

The pool 611 comprises multiple logical volumes 621, 622, 623. A virtual volume 631 that is identified by the identifier "VVOL-A" and a virtual volume 632 that is identified by the identifier "VVOL-B" belong to the pool 611.

The virtual volume 631 becomes a volume 651 that is identified by the identifier "VOL-A" on the host computer 40 (1). The volume 651 is used from the application program 443 (1) that is identified by the identifier "AP-A". In this configuration, when the application program 443 (1) writes data to the volume 651, the following processing is carried out.

The OS 444, which receives a write request with respect to the volume 651, issues a write request to the storage 30 (1) for the virtual volume 631 corresponding to the volume 651. The input/output processing program 3141 inside the storage 30 (1) that receives this write request notifies the thin provisioning program 3143 to the effect that there was a write request. The thin provisioning program 3143, upon receiving this notification, determines whether or not a storage area (a real page or chunk) inside the pool 611 has been allocated to the write-target storage area (virtual page) from among all of the storage areas of the virtual volume 631.

The thin provisioning program 3143, in a case where it was determined that a real page has not been allocated to the write-target virtual page, selects a real page from among the real storage areas of the respective logical volumes comprising the pool 611, and allocates this real page to the write-target virtual page. Data from the application program 443 (1) is written to the real page that has been allocated to the virtual page. In a case where a real page has already been allocated to the write-target virtual page, the data written from the application program 443 (1) is stored in this allocated real page.

The above processing is carried out in the same way for the virtual volume 632 that shares the pool 611, the volume 652 that uses this virtual volume 632, and also the application program 443 (2). A storage area (a real storage area) having a capacity that corresponds to the total of the sum of the real pages allocated to the virtual volume 631 and the sum of the real pages allocated to the virtual volume 632 is used from the pool 611.

Next, the actions in a case where the pool size is insufficient will be described. For example, the following five actions can be cited for dealing with a case in which the pool 612 inside the storage 30 (2) has a capacity shortage.

A first action is to expand the pool 612 using an unused volume 642 from inside the same storage 30 (2) (Arrow 691 of FIG. 2). When an unused volume 642 exists inside the storage 30 (2), the size of the pool 612 can be expanded by adding this volume 642 to the pool 612.

A second action is to expand the pool 612 using an unused volume 643 from inside another storage 30 (4) (Arrow 692 of FIG. 2). Conditions that make it possible to use the second action are the existence of an unused volume 643 in the other storage 30 (4), and a function for the storage 30 (2) to access the volume inside the other storage 30 (4).

The function for the one storage 30 (2) to access the volume 643 inside the other storage 30 (4) can be called an external connection function. Viewed from the one storage 30 (2), the other storage 30 (4) is an external storage that exists outside of the one storage 30 (2). The volume 643 inside the other storage 30 (4) is an external volume that exists outside of the one storage 30 (2). A virtual volume 625 for connecting to the external volume 643 is provided inside the one storage 30 (2). This connection volume 625 can be called an external connection volume. The size of the pool 612 can be expanded by adding the external connection volume 625 to the pool 612.

In a case where the external volume 643 and the external connection volume 625 are connected, a connection table for defining the connection relationship between the external volume 643 and the external connection volume 625 is provided. The connection table, simply stated, is a mapping table showing the corresponding relationship between the storage space of the external connection volume 625 and the storage space of the external volume 643.

The one storage 30 (2), upon receiving a command from the host computer 40, uses the mapping table to convert this command to a command to be sent to the other storage 30 (4). The one storage 30 (2) sends the converted command to the other storage 30 (4). The one storage 30 (2) responds to the host computer 40 based on the response from the other storage 30 (4).

A third action is to expand the pool 612 by appropriating a logical volume 627 comprising the pool 614 inside the other storage 30 (4) (Arrow 693 of FIG. 2). Conditions that make it possible to use the third action are the conditions for the second action, plus the ability to remove the logical volume 627 from the pool 614 inside the other storage 30 (4).

A fourth action is to use the function(s) of the storage 30 (2) to migrate a virtual volume 634 to the pool 613 inside another storage 30 (3) (Arrow 694 of FIG. 2). Conditions that make it possible to use the fourth action are having a function(s) for the storage 30 (2) to migrate the virtual volume 634 to the other storage 30 (3), and surplus capacity in the migration-destination pool 613 to accommodate the virtual volume 634. Migration of the virtual volume 634 to the other pool 613 signifies associating the virtual volume 634 to the storage area of the other pool 613.

Furthermore, there may be cases where a precondition for executing the function(s) for migrating the virtual volume 634 to the other pool 613 is the fact that the application program 443 (3) is not operating (not in operation). In this case, this precondition is included in the conditions that make it possible to use this fourth action.

A fifth action is to migrate a virtual volume to a pool 611 inside another storage 30 (1) using a function of the host computer 40 (2) (Arrow 695 of FIG. 2). Conditions that make it possible to use the fifth action are having a function for the host computer 40 (2) to migrate a virtual volume 633 (post-migration virtual volume 632) from the storage 30 (2) to the other storage 30 (1), and surplus capacity in the migration-destination pool 611 to accommodate the virtual volume 633.

Furthermore, the same as for the fourth action, in a case where suspending (not operating) the application program 443 (2) is a precondition for executing the function for migrating the virtual volume 633 to the other pool 611, this precondition will also have to be satisfied.

Furthermore, in a case where multiple pools exist inside the storage 30 (2), it is also possible to migrate a virtual volume from the one pool inside the storage 30 (2) to another pool inside the storage 30 (2). In addition, a logical volume comprising another pool inside the storage 30 (2) can be removed and added to the one pool.

Next, each type of information used by the management server program 211 and the processing executed by the management server program 211 will be explained. A case in which the management server program 211 automatically executes a selected action will be explained below. The configuration may also be such that the management server program 211 stops at presenting the selected action to the user instead. In a case where the user approves the presented action, this action is executed.

FIG. 3 shows an example of the data structure and data of host-volume information 212 that is used by the management server program 211. The host-volume information 212 holds information in virtual volume units. This attribute information comprises a virtual volume number (VVOL # in the drawing) 2121, an application program number (AP # in the drawing) 2122, pool number (POOL # in the drawing) 2123, used size 2124, application program operating period 2125, volume migration function (migration function in the drawing) 2126, and cost category 2127

In the following explanation, a name, an identifier, identification information, and a number are information used to distinguish each target from another target, and are interchangeable. For example, virtual volume number can also be called virtual volume identifier or virtual volume name. In addition, the configuration of the tables is not limited to the example shown in the drawing. For example, in this example, the required information can also be managed by linking multiple tables.

Next, each attribute of the host-volume information 212 will be explained. The virtual volume number 2121 holds the identifier of the virtual volume. The application program number 2122 holds the identifier of the application program 443 that uses the virtual volume. The pool number 2123 holds the identifier of the pool to which the virtual volume belongs. The used size 2124 holds the actually used size of the entire volume size of the virtual volume, in other words, the size allocated by a page inside the pool.

The application program operating period 2125 holds the operating period of the application program 443 that uses the virtual volume. The volume migration function 2126 shows whether or not a volume migration is possible on the host computer 40 that uses the virtual volume. In a case where a volume migration is possible, this function 2126 also shows whether or not a migration is possible while the application program 443 is in operation. In the example of FIG. 3, "non-stop I/O" indicates that the migration of a virtual volume is possible while the application program 443 is in operation.

The cost category 2127 shows the cost category of the pool to which the virtual volume belongs. The cost category is an identifier. The cost category is configured to distinguish between the grade of each logical volume comprising a pool or the section to which it belongs.

Grades are classified in accordance with the price range of the logical volume. For example, "A" denotes a volume in a high price range, "B" denotes a volume in a medium price range, and "C" denotes a volume in a low price range. A pool that is configured in cost category "A" comprises a high price range volume. A pool that is configured in the cost category "A, B" comprises a high price range volume and/or a medium price range volume. A high price range volume can also be called a high reliability volume, a medium price range volume can also be called a medium reliability volume, and a low price range volume can also be called a low reliability volume. A high reliability volume comprises a high reliability disk drive. A medium reliability volume comprises a medium reliability disk drive. A low reliability volume comprises a low reliability disk drive.

The section to which a logical volume belongs is used in a case where each logical volume comprising a pool is allocated by section. "A" is configured for section A, "B" is configured for section B, and "C" is configured for section C. The cost category is used to prevent either the properties or the location of the virtual volume and pool from changing.

By making a determination as to whether or not a cost category is compatible, for example, it is possible to prevent an important virtual volume that should be associated with a pool comprising high price range virtual logical volumes from being migrated to a pool comprising low price range logical volumes. Or, it is possible to prevent a virtual volume that is being used in section A from being migrated to a pool comprising section B logical volumes.

The cost category 2144 may include multiple categories as described hereinabove. A case where multiple categories have been configured denotes that any category can be applied. Furthermore, the host-volume information 212 can be created based on information acquirable from the thin provisioning program 3143 inside the storage 30, the application program 443 and the volume migration program 442 on the host computer 40 and so forth, and information inputted from the administrator.

FIG. 4 shows examples of the data structure and data of the storage information 213 that is used by the management server program 211. The storage information 213 holds information in storage 30 units. This attribute information comprises a storage number (storage # in the drawing) 2131, a volume migration function (migration function in the drawing) 2132, and a function for accessing a volume inside another storage (external connection function in the drawing) 2133.

The storage number 2131 holds the identifier of the storage 30. The volume migration function 2132 holds information as to whether or not the storage 30 has a volume migration function. In a case where the storage 30 has a migration function, this function 2132 also denotes whether or not migration is only possible when the application program 443 is suspended. For example, in the example of FIG. 4, "stop I/O" indicates that the application program 443 is suspended, and that a volume can be migrated only when an I/O request is not generated. Furthermore, the storage information 213 can be created based on information and the like acquirable from the input/output program 3141 and volume migration program 3142 inside the storage 30.

FIG. 5 shows examples of the data structure and data of the pool information 214 that is used by the management server program 211. The pool information 214 holds information in pool units. This attribute information comprises a pool number (pool # in the drawing) 2141, a pool size 2142, a usage 2143, and a cost category 2144.

The pool number 2141 holds the pool identifier. The pool size 2142 holds the total size of the pool, that is, the total size of the real page(s) allocatable to the virtual volume. Usage 2143 denotes the percentage of the pool size 2142 accounted for by the size of a page that has been allocated to the virtual volume. In a case where the entire pool size has been allocated to the virtual volume, the usage becomes 100%.

The cost category 2144 is given for the same purpose as the cost category 2127 in the host-volume information 212. The cost category 2144 is the identifier for distinguishing between the logical volumes that comprise the pool. Furthermore, the pool information 214 may be created based on the thin provisioning program 3143 inside the storage 30 and information and the like inputted directly from the administrator.

FIG. 6 shows the data structure and data of the unused volume information 215 that is used by the management server program 211. The unused volume information 215 holds information in unused volume units. This attribute information comprises an unused volume number 2151, a storage number 2152, a size 2153, and a cost category 2154.

The unused volume number 2151 holds the unused volume identifier. The storage number 2152 holds the identifier of the storage in which the unused volume exists. The size 2153 holds the storage size of the unused volume. The cost category 2154 holds the identifier that denotes the cost category of the unused volume. The cost category 2154 may hold multiple identifiers. Furthermore, the unused volume information 215 may be created based on information acquirable from the thin provisioning program 3143 inside the storage 30 and the disk controller 315, and information and the like directly inputted by the administrator.

FIG. 7 shows examples of the data structures and data of the management policy information 216 that is used by the management server program 211. The management policy information 216 holds information in management policy units. The management policy is information denoting guidelines with respect to the management server program 211 executing various types of management operations. The management policy, for example, denotes guidelines corresponding to a case where the pool size is insufficient.

The attributes of the management policy information 216 are a policy number 2161, a coverage 2162, a start condition 2163, an action 2164, and a success condition 2165. The policy number 2161 holds a policy identifier. The coverage 2162 holds the target to which a policy will be applied. In the example of FIG. 7, "all pools" indicates that the same policy is applied to all of the pools. In a case where the identifier of an identified pool is specified as the application target, the policy is applied only to this identified pool.

The start condition 2163 holds a condition that will trigger the execution of an identified action. In the example of FIG. 7, the start condition is stipulated as a condition related to pool usage. The action 2164 holds a type of action. The types of action can include "expand pool size", "alert" and so forth. "Expand pool size", for example, signifies that the size of a pool is to be expanded when the pool size is insufficient. "Alert", for example, signifies that an alert is to be issued to the user in a case where the pool size is becoming insufficient.

The success condition 2165 holds a condition that becomes the goal of an action. In the example shown in the drawing, the action success condition (goal) is for the pool usage to fall within an identified range. Furthermore, the management policy information 216 may be prepared beforehand by the vendor of the management server program 211, or can be created manually by the administrator.

Figure 8:
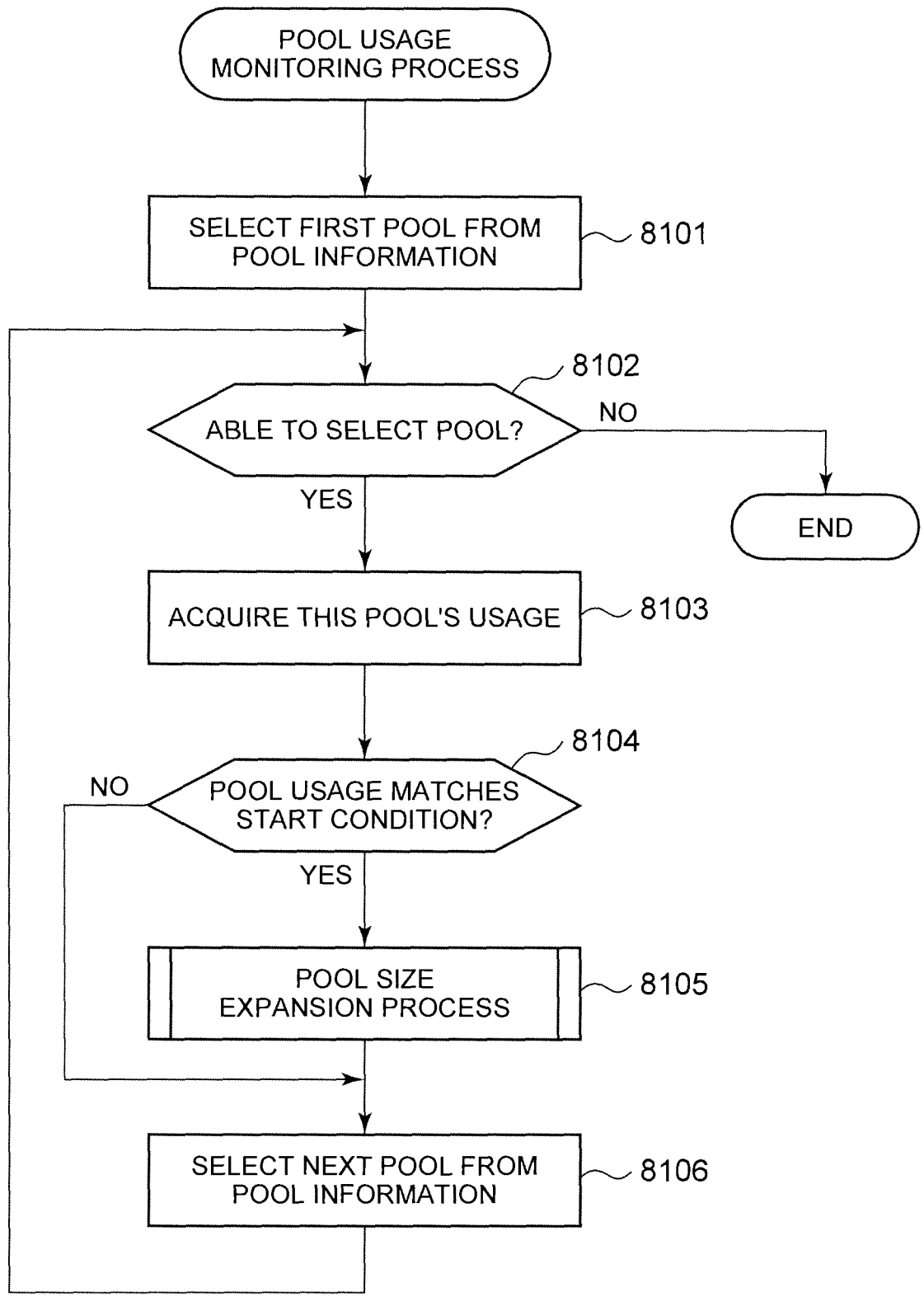
FIG. 8 is a flowchart of a process for monitoring pool usage.

FIG. 8 is a flowchart showing a process for monitoring pool capacity usage. Hereinafter, step will be abbreviated as S. Pool capacity usage is an index for measuring pool size sufficiency, and the closer this value is to 100%, the more insufficient the size. In monitoring the capacity usage, a monitoring threshold is configured beforehand, and some sort of action will be executed when the capacity usage of each pool exceeds this threshold. The specific procedure will be shown below. In the following explanation, the management computer will be given as the subject of the operation. Since the following functions are realized in accordance with the microprocessor 22 reading and executing the management server program 211, the explanation can also be given using either the microprocessor 22 or the management server program 211 as the subject of the operation.

The management computer 20 refers to the pool information 214 and selects the first pool (S8101). The management computer 20 determines whether or not it was possible to select the processing-target pool (S8102). In a case where there is no pool to select, the processing ends (S8102: NO). In a case where there is a pool to select, the management computer 20 executes the following processing.

The management computer 20 acquires the capacity usage of the selected pool (S8103). The management computer 20 checks whether or not the capacity usage acquired in S8103 exceeds the threshold stipulated in the management policy information 216 (S8104). In other words, a determination is made as to whether or not the acquired capacity usage matches the start condition 2163.

In a case where the capacity usage exceeds the threshold (S8104: YES), the management computer 20 implements processing for expanding the pool size to deal with the capacity shortage (S8105). The pool size expansion process will be explained in detail further below using FIG. 9.

In a case where the capacity usage of the processing-target pool does not match the start condition (S8104: NO), S8105 is skipped.

The management computer 20 selects the next pool from the pool information 214 as a new processing-target pool (S8106), and returns to S8102. When the processing for all of the pools registered in the pool information 214 is complete and there are no more selectable pools (S8102: NO), this processing ends normally.

Figure 9:
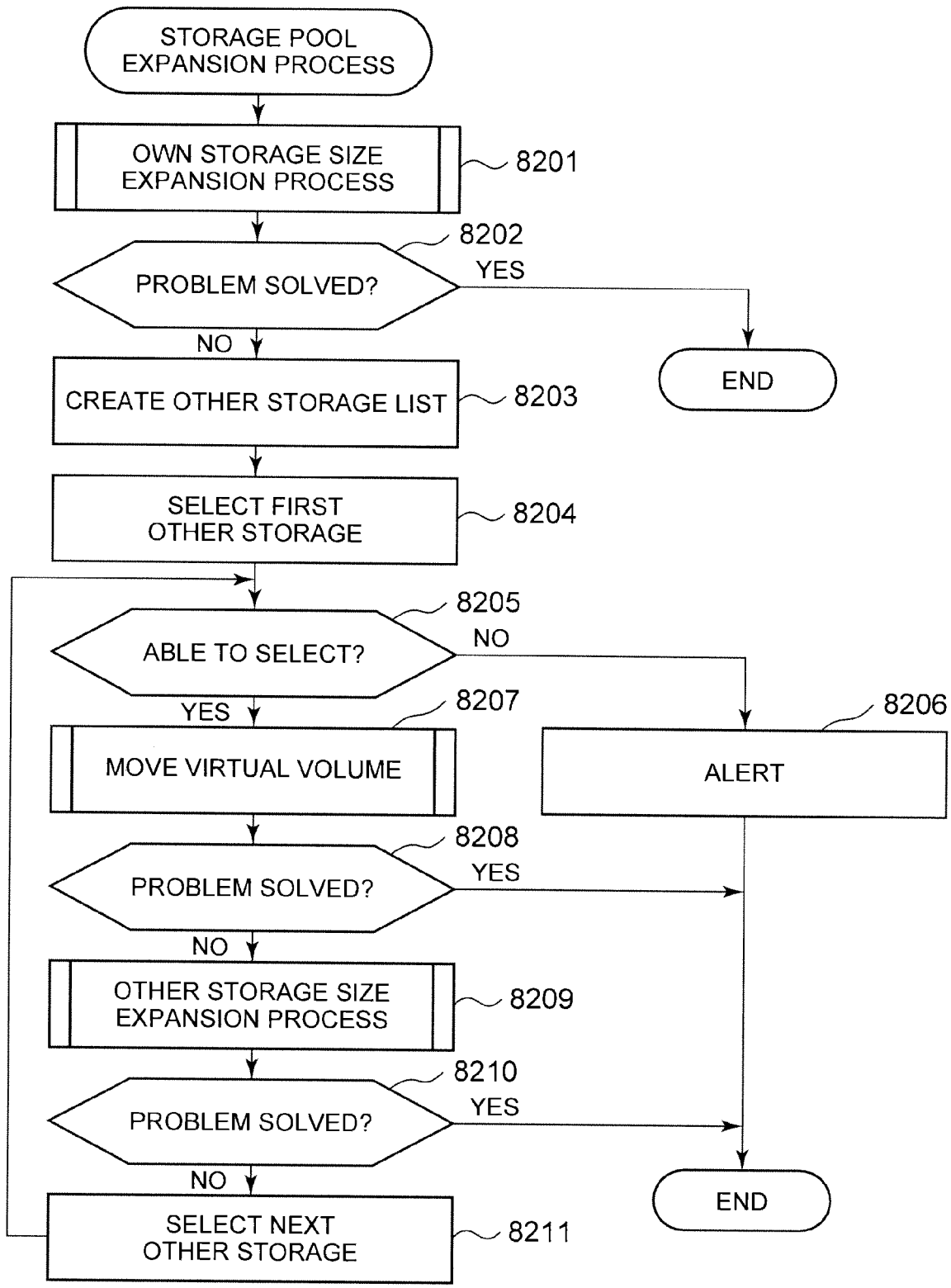
FIG. 9 is a flowchart of a process for expanding the size of a pool.

FIG. 9 is a flowchart of a process for expanding the size of a pool to deal with a pool size that is insufficient. The processing shown in the flowchart of FIG. 9 is executed in S8105 of FIG. 8. In this processing, the appropriateness of each action in a case where there is insufficient pool size is evaluated in order, and the action that was assessed as being appropriate is executed. The specific procedure will be explained below. Hereinafter, the processing-target storage 30 will be called the own storage to make a distinction with another storage other than the processing-target storage.

First, the management computer 20 determines whether or not it is possible to expand a pool inside the storage (the own storage) in which a capacity shortage has occurred, and in a case where this is possible, executes the pool expansion (S8201). The processing for expanding the pool size inside the own storage will be described in detail further below using FIG. 10. In a case where the pool capacity shortage is resolved by the execution of S8201 (S8202: YES), this processing ends.

In a case where the pool capacity shortage is not resolved by the execution of S8201 (S8202: NO), the management computer 20 creates a list of other storages exclusive of the own storage (other storage list) based on the storage information 213 (S8203). Furthermore, the configuration may also be such that the other storage list is not created separately from the storage information 213 but rather acquires the other storage information from the storage information 213. In this case, the management computer 20 does not select the own storage in S8204 and S8211.

The management computer 20 selects one other storage that is listed at the top of the other storage list (S8204). The management computer 20 determines whether or not it was possible to select the other storage as the processing-target (S8205). In a case where the other storage could not be selected (S8205: NO), the management computer 20 issues an alert to the effect that a method for resolving the pool capacity shortage was not found (S8206), and ends this processing.

In a case where it was possible to select the other storage as the processing target (S8205: YES), the management computer 20 checks the appropriateness of the action that expands the pool size in accordance with migrating a virtual volume, and in a case where this is appropriate, executes this action (S8207). The method for expanding the pool size by migrating a virtual volume will be described further below using FIG. 11. In a case where the result of the processing on S8207 resolves the pool capacity shortage, this processing ends (S8208: YES).

In a case where either it is not possible to migrate a virtual volume or the pool capacity shortage will not be resolved even though a virtual volume is migrated (S8208: NO), the management computer 20 checks the appropriateness of the action that expands the pool size by using the other storage, and in a case where this is appropriate, executes this action (S8209). S8209 will be described in detail further below using FIG. 12.

In a case where the result of executing the pool size expansion method that uses the other storage resolves the pool capacity shortage, this processing ends (S8210: YES). In a case where it is not possible to resolve the pool capacity shortage using the other storage (S8210: NO), the management computer 20 selects the next other storage from the other storage list (S8211) and returns to S8205.

Figure 10:
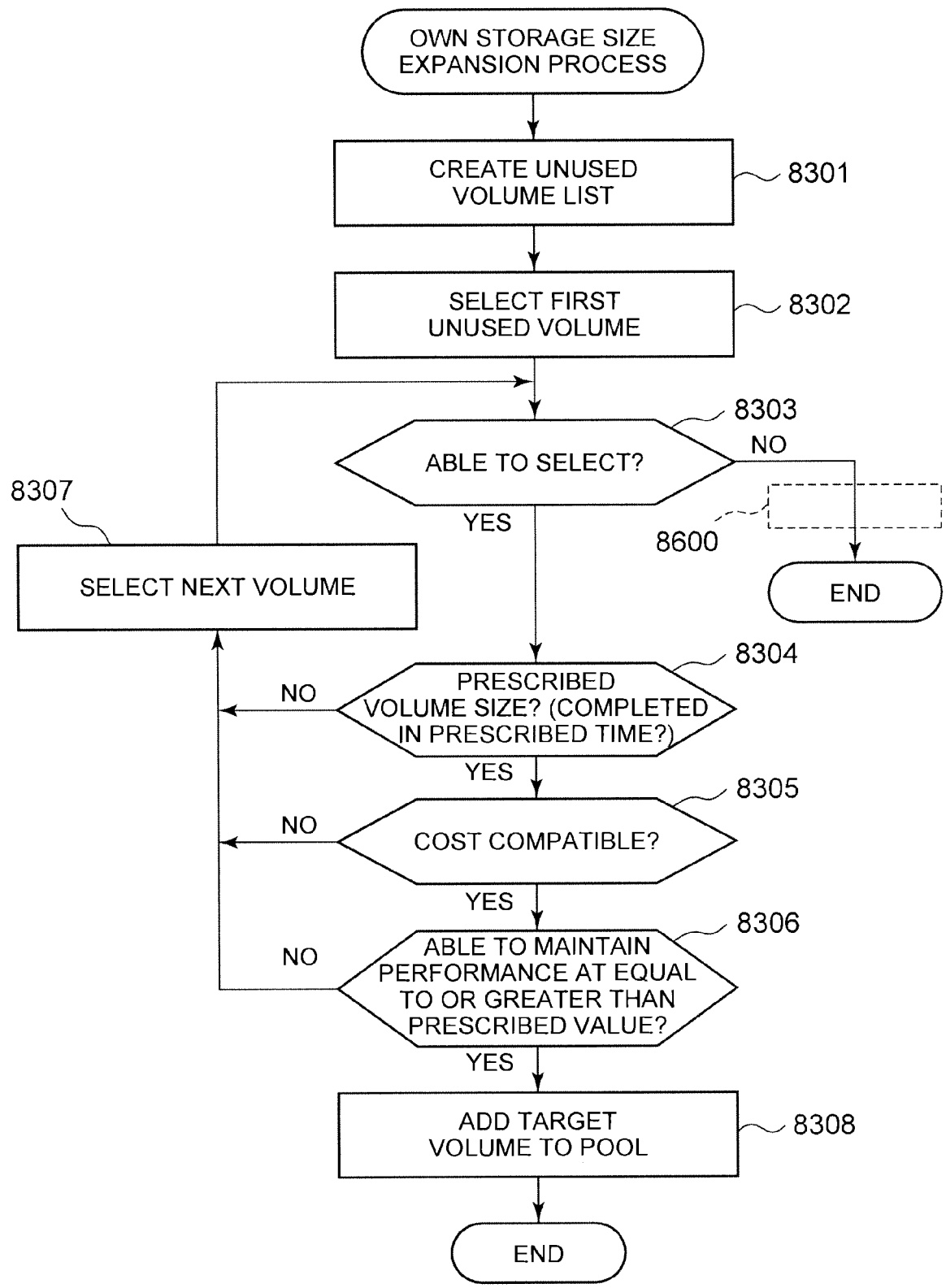
FIG. 10 is a flowchart showing a process for expanding the size of a pool inside one's own storage.

FIG. 10 is a flowchart showing the process for expanding a pool size inside the own storage, which is executed in S8201 of FIG. 9. In the following process, the appropriateness of whether or not an unused volume is suitable as a pool size expansion volume is evaluated from each of the standpoints of size, cost and performance for each unused volume inside the own storage. An unused volume that has been assessed as appropriate is added to the pool with the insufficient size, and expands the size of this pool.

First, the management computer 20 creates a list of unused volumes inside the own storage (hereinafter may also be called the expansion candidate volume list) from the unused volume information 215 (S8301).

Furthermore, the configuration may also be such that the candidate volume list is not created separately from the unused volume information 215 but rather acquires the unused volume list from the unused volume information 215. In this case, the management computer 20 selects only the unused volume inside the own storage in S8302 and S8307.

The management computer 20 selects the initial unused volume from the candidate volume list (S8302). In a case where a selectable unused volume does not exist (S8303: NO), this processing ends as an incomplete countermeasure. Furthermore, in a case where a selectable unused volume is not found (S8303: NO), processing (S8600), which will be described further below using FIG. 13, may be implemented.

The management computer 20, in a case where it was possible to select one unused volume from the candidate volume list (S8303: YES), determines whether or not this unused volume is the prescribed size (S8304).

The prescribed size, for example, is the size required for resolving the insufficiency of the pool size. Specifically, prescribed size signifies the size required for satisfying the management policy success condition 2165. In this way, a determination can be made as to whether or not the size of the unused volume matches the goal based on the contents of the management policy information 216.

For example, as shown in FIG. 7, a policy having a start condition 2163 of "pool usage 70 to 84%" is applied to a pool with a capacity usage of 75%. The contents of the success condition 2165 related to this policy action is stipulated as "lower pool usage to range of 40 to 60%". The reason for configuring "40%" as the lower limit usage here is to prevent the action from going too far. The add size required for obtaining the targeted capacity usage is determined from the current pool size and capacity usage in accordance with Formula (1) below.

$$(\text{Add size}) = (1/\text{targeted capacity usage}) \times \text{current capacity usage} \times \text{current pool size} - \text{current pool size} \quad (1)$$

In a case where the selected unused volume size is 100 TB, the add size required for reducing the 75% capacity usage down to 40% in accordance with the above Formula (I) would be $(1/0.4) \times 0.75 \times 100 - 100 = 87.5$ TB. Similarly, the add size required to lower the 75% capacity usage down to 60% would be $(1/0.6) \times 0.75 \times 100 - 100 = 25$ TB.

Consequently, an add size in the range of 25 TB to 87.5 TB is necessary to bring the pool capacity usage from the current 75% to within the range of 40% to 60%. In a case where the selected unused volume size is within the above-mentioned range, a pool expansion that uses this volume can be determined to be appropriate.

In a case where the selected unused volume size does not match the prescribed size (S8304: NO), the management computer 20 selects the next unused volume from the candidate volume list (S8307) and moves to S8303.

In a case where the selected unused volume size matches the prescribed size (S8304: YES), the management computer 20 evaluates the appropriateness of the cost category of this unused volume (S8305). In the drawing, "cost category" is abbreviated as "cost" for the sake of convenience.

Specifically, the management computer 20 determines whether or not the content of the cost category configured for the selected unused volume (the content of the cost category 2154 of the unused volume information 215) is included in the content of the cost category configured for the allocation-destination pool (content of the cost category 2144 of the pool information 214).

For example, as shown in FIG. 6, "A" is configured as the cost category 2154 for the unused volume comprising the identifier "UVOL-A". As shown in FIG. 5, "A, B" is configured as the cost category 2144 for the pool comprising the identifier "POOL-B". In accordance with this, since the unused volume cost category "A" is included in the pool cost category "A, B", the cost category of this pool (POOL-B) is compatible with the cost category of the unused volume.

In a case where it has been determined that the unused volume cost category and the pool cost category are not compatible (S8305: NO), the management computer 20 moves to S8307.

In a case where the unused volume cost category and the pool cost category are compatible (S8305: YES), the management computer 20 predicts and evaluates the performance of the pool size after it has been expanded (S8306). The management computer 20, in a case where the selected unused volume has been added to the pool, determines whether or not this pool is able to maintain performance of equal to or greater than a prescribed value.

For example, in a case where a low-speed logical volume has been added to a pool comprising a high-speed logical volume, the average response performance of this pool will drop. When the response performance of the pool drops, the I/O performance of the virtual volume that uses a page inside this pool also drops.

To prevent a drop in the performance of the virtual volume, for example, the add-target unused volume may be limited to a logical volume that comprises the same or greater performance than the performance of the logical volume currently being used.

Furthermore, the parallelism of the I/O performance with respect to the logical volumes inside this pool will increase in accordance with adding the unused volume to the pool. Therefore, even in a case where a low-speed logical volume has been added, there is the likelihood that the average performance of the pool either will not drop or will increase. In S8306, this point may be added for consideration.

In addition, the configuration may also be such that in a case where the extent of the virtual volume performance drop is estimated in S8306 and this extent is within an allowable range, the selected unused volume is added to the pool.

In a case where it is predicted that a performance-related problem will not occur subsequent to volume addition (S8306: YES), the management computer 20 expands the pool size using the selected unused volume (S8308) and ends this processing.

In a case where it is predicted that the performance of a pool will not be able to be maintained at equal to or greater than a prescribed value when the selected unused volume is added to this pool (S8306: NO), the management computer 20 selects the next unused volume from the candidate volume list (S8307) and returns to S8303.

Furthermore, in the processing of FIG. 10, a case in which the capacity shortage of a pool can be dealt with simply by added one unused volume to this pool. However, the present invention is not limited to a configuration that adds one unused volume, and the configuration may also be such that the pool capacity shortage is resolved by adding multiple unused volumes to the pool.

In accordance with this, for example, in the size check of S8304, it is determined that the size of the unused volume will match the add goal except in a case where this size exceeds an upper limit value. Then, the configuration may be such that, through the respective checks of S8305 and S8306, a list of unused volumes is created, multiple unused volumes the total size of which constitutes the prescribed size are selected from this list, and these multiple unused volumes are added to the pool.

In addition, the configuration may also be such that one unused volume, which had been determined in S8304 as not satisfying the prescribed size, is added to the pool. In this case, the premise will be that multiple actions (FIG. 11, FIG. 12) other than the action shown in FIG. 10 will be used in combination.

In addition, even in a case where the usage goal defined as the success condition is not reached, pool usage can be lowered more than when an unused volume is not added. Therefore, even though an unused volume does not satisfy the prescribed size, adding this unused volume to the pool can lower the risk of the pool size being depleted.

In addition, in a case where multiple pools exist inside the own storage, it is also possible to deal with a capacity shortage by moving a logical volume that is being used in another pool (another pool inside the own storage) other than the processing-target pool in which there is a capacity shortage to the processing-target pool.

An action like this is shown in FIG. 10 as S8600. The action that uses another pool inside the own storage will be explained by referring to FIG. 13.

Prior to the processing shown in the flowchart of FIG. 10 ending as an incomplete countermeasure, the management computer 20 creates, with respect to either one or multiple other pools that exist inside the own storage, a list of logical volumes comprising these other pools (S8601).

The management computer 20 selects the first volume from within the list of volumes comprising the other pool (S8602). The management computer 20 determines whether or not the selected volume can be appropriated to the processing-target pool (the own pool with the capacity shortage) (S8603).

As one criterion for determining whether or not appropriation will be possible, for example, the fact that the capacity usage of the other pool is equal to or less than a predetermined criterion even in a case where this logical volume was removed from the other pool can be cited. This criterion is provided to prevent the appropriation-source pool from experiencing a capacity shortage in accordance with the appropriation of the logical volume.

In a case where a logical volume inside the other pool is able to be appropriated (S8603: YES), the management computer 20 carries out the same determinations described using FIG. 10. The management computer 20 determines whether or not this logical volume comprises the prescribed size (S8604). Next, the management computer 20 determines whether or not the cost category of this logical volume and the cost category of the appropriation-destination pool (the own pool) are compatible (S8605). Next, the management computer 20 predicts whether or not the own pool will comprise performance of equal to or greater than the prescribed value (S8606).

In addition, the management computer 20 can take into account the fact that the performance of the other pool will drop when the logical volume is removed from the other pool, and the fact that the removal of the logical volume will take time (S8607).

Since the number of logical volumes comprising the other pool decreases when one logical volume is removed from the other pool, the parallelism of the I/O processing in the other pool drops. Therefore, the response performance of the other pool is likely to drop. In a case where a logical volume is removed from the other pool, the data that is being stored in this logical volume must be copied and moved to a different logical volume inside the other pool. Therefore, the data copy is likely to take a long time depending on the amount of data that is stored in the appropriation-target logical volume. From this point of view, the configuration may also be such that a logical volume in which a large amount of data is stored will be determined to be an inappropriable volume.

Furthermore, in a case where multiple appropriable logical volumes exist, for example, any one of the logical volumes may be selected in accordance with criteria such as the capacity usage of the appropriation-source pool, the insufficiency of the logical volume size, the brevity of the time required for removal, the small size of the performance drop and so forth.

In a case where the respective determination steps are not satisfied, the management computer 20 selects the next volume (S8608) and returns to S8603. In a case where all of the determination steps are satisfied, the management computer 20 removes a logical volume inside the other pool from the other pool, and adds this removed logical volume to the own pool that is suffering from a shortage of capacity (S8609). Return to FIG. 11.

Figure 11:
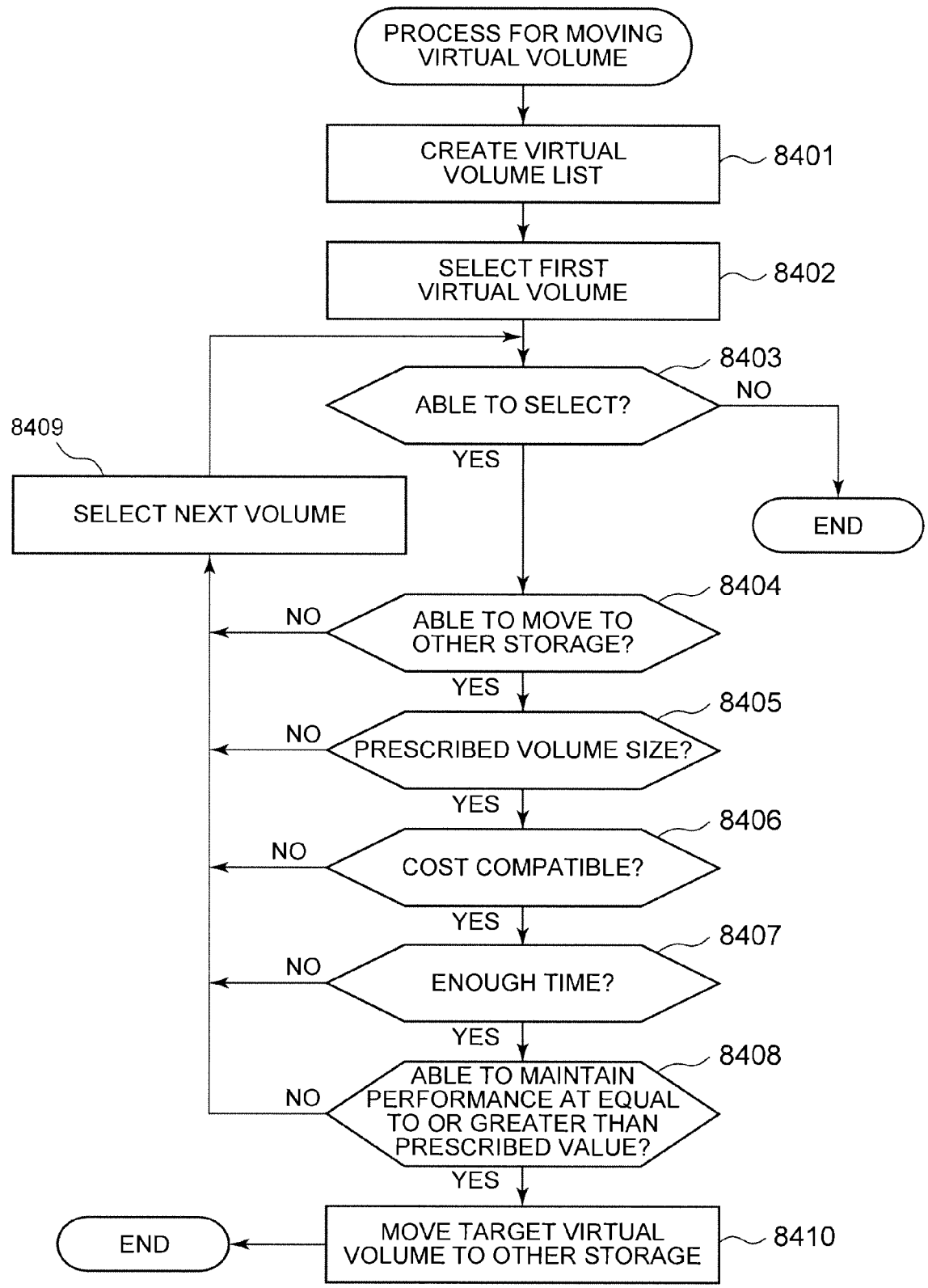
FIG. 11 is a flowchart of a process for migrating a virtual volume.

FIG. 11 is a flowchart showing the process for resolving a pool capacity shortage by moving a virtual volume, and is the processing executed in S8207 of FIG. 9. In this processing, each virtual volume that is using the pool with the capacity shortage is evaluated from the points of the presence or absence of migration means, volume size, compatibility of cost categories, migration completion time, and post-migration performance. The virtual volume, which has been determined to be appropriate for moving to the other pool of the other storage is moved to the other pool of the other storage. The specific procedure will be described hereinbelow.

First, the management computer 20 creates a list of virtual volumes that are using the capacity-deficient pool (S8401). Since this virtual volume list shows a list of virtual volumes that will become migration candidates, this list will be called the migration candidate virtual volume list in the following explanation.

The migration candidate virtual volume list may be created from the virtual volume information 212. Or, the migration candidate virtual volume list can also be obtained from the virtual volume information 212 without being created separately from the virtual volume information 212. In accordance with this, the migration candidate virtual volume is selected from among the virtual volumes that belong to the capacity-deficient pool in S8402 and S8409.

The management computer 20 selects a first virtual volume from the migration candidate virtual volume list (S8402). In a case where a virtual volume could not be selected (S8403: NO), this processing ends as an incomplete countermeasure in S8402 and S8409.

In a case where one virtual volume was able to be selected (S8403: YES), the management computer 20 checks for the presence or absence of means for moving this virtual volume to the other storage 30 that has been selected (S8404). There are means for moving a virtual volume on the storage 30 side, and means for moving a virtual volume on the host computer 40 side.

A determination can be made as to whether or not the storage 30 comprises means for moving a virtual volume from the contents of the volume migration function 2132 of the storage information 213. A determination can be made as to whether or not the host computer 40 comprises means for moving a virtual volume in accordance with the contents of the volume migration function 2126 of the virtual volume information 212.

The management computer 20 checks for the presence or absence of virtual volume migration means on the storage side and for the presence or absence of virtual volume migration means on the host computer side, and determines whether or not at least one means for migrating a virtual volume to the other storage exists (S8404).

In a case where means for migrating the virtual volume to the other storage do not exist (S8404: NO), the management computer 20 selects the next virtual volume (S8409) and returns to S8403.

In a case where there exists at least one means for moving the virtual volume to the other storage (S8409: YES), the management computer 20 determines whether or not this virtual volume is the prescribed size (S8405). A determination can be made as to whether or not the size of the virtual volume matches the goal of the management policy in accordance with the contents of the management policy information 216.

For example, as shown in FIG. 7, a policy having a start condition 2163 of "pool usage 70 to 84%" is applied to a pool with a capacity usage of 75%. The contents of the success condition 2165 related to this policy action is stipulated as "lower pool usage to range of 40 to 60%". The migration size of the virtual volume required for obtaining the targeted capacity usage is determined from the current pool size and capacity usage in accordance with Formula (2) below.

$$(\text{Migration size}) = (\text{current capacity usage} - \text{targeted capacity usage}) \times \text{pool size} \qquad (2)$$

In a case where the pool size is 100 TB, the add size required for reducing the 75% capacity usage down to 40% would be $(0.75-0.4) \times 100 = 35$ TB. Similarly, the add size required to lower the 75% capacity usage down to 60% would be $(0.75-0.6) \times 100 = 15$ TB.

Therefore, a virtual volume having a volume size in the range of 15 TB to 35 TB must be migrated to the other pool of the other storage to bring the pool capacity usage to within the range of 40% to 60%.

In a case where the size of the virtual pool selected in S8403 is within the above-mentioned range, a determination can be made that the migration of this virtual volume is appropriate. In a case where it is determined that the size of the virtual volume does not match the prescribed size (S8405: NO), the management computer 20 moves to S8409.

In a case where the size of the virtual volume matches the prescribed size (S8405: YES), the management computer 20 determines whether or not the cost category configured for this virtual volume matches the cost category configured for the migration-source other pool (S8406).

Specifically, in a case where the content of the cost category 2154 of the virtual volume information 212 is included in the content of the cost category 2144 of the pool information 214, a determination can be made that the two cost categories are compatible. For example, a case in which an evaluation with respect to moving the virtual volume comprising the identifier "VVOL-B" shown in FIG. 3 to the pool comprising the identifier "POOL-A" shown in FIG. 5 will be explained. As shown in FIG. 3, the cost category 2154 of the virtual volume (VVOL-B) is "A, B". As shown in FIG. 5, "A" is configured in the cost category 2144 of the pool (POOL-A). Since the cost category "A" of the migration-destination pool is included in the cost category "A, B" of the virtual volume, the management computer 20 determines that the two cost categories are compatible. In a case where it is determined that the cost category of the virtual volume is not compatible with the cost category of the migration-destination pool, the management computer 20 proceeds to S8409.

In a case where it is determined that the two cost categories are compatible (S8406: YES), the management computer 20 determines whether or not the time required for migrating the virtual volume to the other pool (the required migration time) will enable the pool capacity shortage to be resolved in time (S8407).

For example, in a case where the pool capacity usage rises suddenly, the pool capacity shortage must be dealt with promptly. The size of this pool must be expanded before the pool capacity usage reaches 100%. For this reason, both the date/time when the pool capacity usage reaches 100% (the date/time the pool size is depleted) and the date/time when the capacity shortage countermeasure is complete (migration completion date/time) must be estimated.

The date/time when the pool size is depleted, for example, may be computed based on a rate of increase per unit of time determined from the past history of pool capacity usage. The migration completion date/time, for example, may be computed based on information such as (a) whether or not the virtual volume is able to be migrated while the application program 443 is in operation, (b) the operating period of the application program 443, and (c) the required migration processing time for the virtual volume.

The (a) can be checked by referring to the volume migration function 2126 of the virtual volume information 212 with respect to the volume migration program 442 inside the host computer 40. In a case where the volume migration program 3142 inside the storage 30 is used, the check can be made by referring to the volume migration function 2132 of the storage information 213.

The (b) can be checked by referring to the application program operating period 2125 of the virtual volume information 212.

The (c) is determined by multiplying the virtual volume size by the virtual volume migration time per size. The per-size virtual volume migration time, for example, can be calculated based on a preconfigured reference value, or selected from the times that it took to migrate the virtual volume in the past. A reference value is respectively prepared for each logical volume performance.

The calculation method for the migration completion date/time will differ in accordance with the contents of the (a). That is, in a case where it is possible to migrate the virtual volume without suspending the application program 443, the migration completion time will become the time obtained by adding the required migration time of the (c) to the current time.

Alternatively, in a case where it is not possible to migrate the virtual volume while the application program 443 is in operation, the migration completion time will become the time obtained by adding the required migration time of the (c) to the application program 443 end-of-operation time.

Furthermore, in a case where the required migration time for the virtual volume is long, there is the likelihood that the migration of the virtual volume will not be complete until the start-of-business time. To prevent a situation like this from occurring, for example, a determination may be made that this virtual volume cannot be migrated in a case where (a) it is not possible to migrate the virtual volume while the application program 443 is in operation, and, in addition, in a case where the estimated migration completion date/time is on or after the application program 443 start time.

Furthermore, it is preferable that the determinations allow plenty of time for both the pool size depletion date/time and the virtual volume migration completion date/time to reach the estimated values. That is, the pool size depletion date/time, for example, will use a time that is a fixed quantity faster than the predicted value. The migration completion date/time will use a time that is a fixed quantity slower than the predicted value. This will make it possible to curb the occurrence of a situation in which the pool size is depleted faster than predicted, and a situation in which the virtual volume migration is completed slower than predicted.

In addition, as an alternative to the above, the configuration may also be such that in a case where action is relatively urgent, such as a case where either the absolute value of the capacity usage is higher than a prescribed upper limit value, or the rate of increase of the capacity usage is higher than a prescribed increase rate, an action (for example, pool expansion) for which the processing time until action completion is relatively short will always be selected.

Furthermore, in a case where both the migration of the virtual volume in accordance with the volume migration program 442 inside the host computer 40 and the migration of the virtual volume in accordance with the volume migration program 3142 inside the storage 30 are possible, either one of these must be selected using one method or another.

The criteria for this selection, for example, can include the speediness of the time until process completion, the size of the load on the host computer 40, and the size of the load on the storage 30. Furthermore, as shown in FIG. 14, in a case where the volume migration program 442 of the host computer 40 is used, the effect could be that a relatively small data transfer size is possible, and, in addition, that unneeded data can be eliminated.

Figure 14:
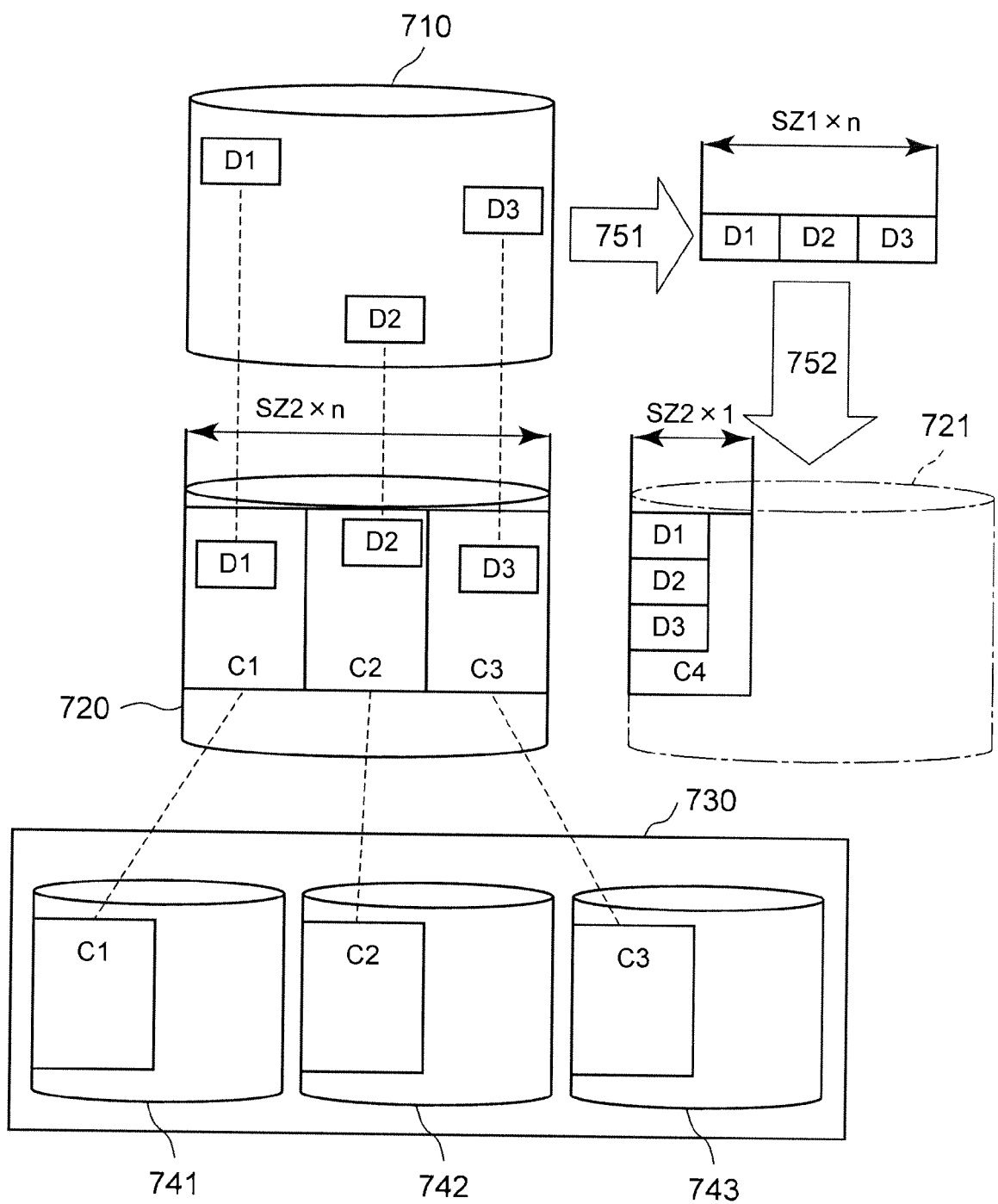
FIG. 14 is a schematic diagram showing how to allocate a real storage area inside a pool to a virtual volume, and the effect achieved in a case where the host computer migrates the virtual volume.

Refer to FIG. 14. The file system is managing n-pieces of data D1, D2, D3 of size SZ1. The usage size on the file system becomes SZ1×n. It is supposed that these data D1, D2, D3 are written discretely to a virtual volume 720. To store each data D1, D2, D3 in the virtual volume 720, n-chunks (real pages) C1, C2, C3 are allocated. It is supposed that the size of a chunk is SZ2 (SZ2>SZ1). Therefore, the size of the page allocated to the virtual volume 720 becomes SZ2×n.

Whereas the amount of data transferred when the host computer 40 migrates the virtual volume is SZ1×n, the amount of data transferred when the storage 30 migrates the virtual volume becomes SZ2×n, the latter of which is larger. For this reason, in the example shown in FIG. 14, in a case where the storage 30 migrates the virtual volume, the required migration time is longer than when the host computer 40 migrates the virtual volume.

Therefore, the difference between the usage size on the file system (SZS1×n) and the size of the page allocated to the virtual volume (SZ2×n) may be used as the criterion for selecting volume migration means.

In addition, even when data on the file system 710 of the OS 444 has been deleted, there could be a case where the storage 30 is unable to recognize that the deleted data is unneeded data. In this case, a page (chunk) is allocated as-is to the virtual volume 720 for the unneeded data.

It is assumed that the volume migration program 442 inside the host computer 40 has a mechanism for migrating data by excluding deleted data. When using the volume migration program 442 to migrate virtual volume data from a migration-source pool 720 to a migration-destination pool 721 (Arrows 751 and 752 in FIG. 14), the unneeded data that has been deleted is not stored in the migration-destination pool 721. Therefore, the pool usage size can be smaller than the pre-migration virtual volume.

In a case where the difference (or the ratio) between the usage size on the file system 710 and the page allocation size to the virtual volume is fixed, priority may be given to executing the volume migration program 442 inside the host computer 40.

Return to FIG. 11. In a case where it has been determined as a result of having executed S8407 that the pool capacity shortage status cannot wait until the virtual volume data migration completion time (S8407: NO), the management computer 20 proceeds to S8409.

In a case where it has been determined that it is possible to wait until the virtual volume data migration is complete (S8407: YES), the management computer 20 predicts and evaluates the performance to the virtual volume subsequent to the migration of the virtual volume (S8408). That is, the management computer 20 determines whether or not the performance of the virtual volume can be maintained even after migration.

The I/O performance of the virtual volume is likely to drop in accordance with the virtual volume being migrated from a pool inside the own storage to a pool inside the other storage. Whether or not the I/O performance of the virtual volume will drop subsequent to migration may be determined by taking into account the performance of the logical volume comprising the pool, the number of logical volumes, the size of the load on the pool, and the amount of I/Os with respect to the migration-target virtual volume for both the migration-source pool and the migration-destination pool. In a case where the extent of the virtual volume performance drop is within an allowable range, this migration may be allowed as being of no particular problem.

In a case where it has been determined as a result of executing S8408 that there is no problem from the standpoint of performance, the selected virtual volume is migrated to the selected other storage 30 (S8410) and this processing ends as a completed countermeasure.

In a case where the post-migration performance of the virtual volume drops by a prescribed value or more (S8408: NO), the next virtual volume is selected from the migration candidate virtual volume list (S8409), and the management computer 20 returns to S8403.

Furthermore, in the flowchart of FIG. 11, a case in which only one virtual volume is migrated to expand the capacity of the migration-source pool is shown, but the present invention is not limited to this, and the configuration may be such that multiple virtual volumes are migrated. In accordance with this, for example, a determination is made in the check of the volume size in S8405 that the virtual volume size satisfies the goal of resolving the pool capacity shortage except in a case where this size is too large. A list of multiple virtual volumes that pass the respective determinations of S8404, S8406, and S8407 is created, and multiple virtual volumes are selected from this list such that the total size of the virtual volumes is within the required size range. The selected multiple virtual volumes are migrated to multiple other pools.

Furthermore, the configuration may be such that the migration of this/these virtual volume(s) is carried out even in a case where the size of the virtual volume(s) in S8405 does/do not reach the prescribed size. In this case, multiple actions are used in combination. Even when the ultimate capacity usage goal is not reached, the capacity usage of the pool can be lowered more than when the virtual volume migration is not performed. Therefore, it is possible to lower the risk of the pool size being depleted.

Although not described in detail in the flowchart of FIG. 11, in a case where multiple pools exist inside the other storage, each step from S8405 to S8408 is carried out for each pool inside the other storage.

In a case where multiple pools are suitable for virtual volume migration, for example, one migration-destination pool may be selected in accordance with the capacity usage of the migration-destination pool, the brevity of the migration time, and the smallness of the post-migration performance drop.

Furthermore, although omitted from the drawing for the flowchart of FIG. 11, consideration may also be given to a case in which multiple pools exist inside the own storage. In a case where multiple pools exist inside the own storage, it is possible to include an option for an action that migrates the virtual volume from the capacity-deficient pool to a pool that has enough free capacity. In accordance with this, similar to the flowchart of FIG. 11, for example, evaluations may be carried out as to the presence or absence of means for migrating the virtual volume to the other pool, whether the virtual volume size matches the goal, whether the cost category of the migration-destination pool is compatible with the cost category of the virtual volume, whether the capacity-deficient pool can wait until the migration completion time, and whether the post-migration performance can be maintained.

Figure 12:
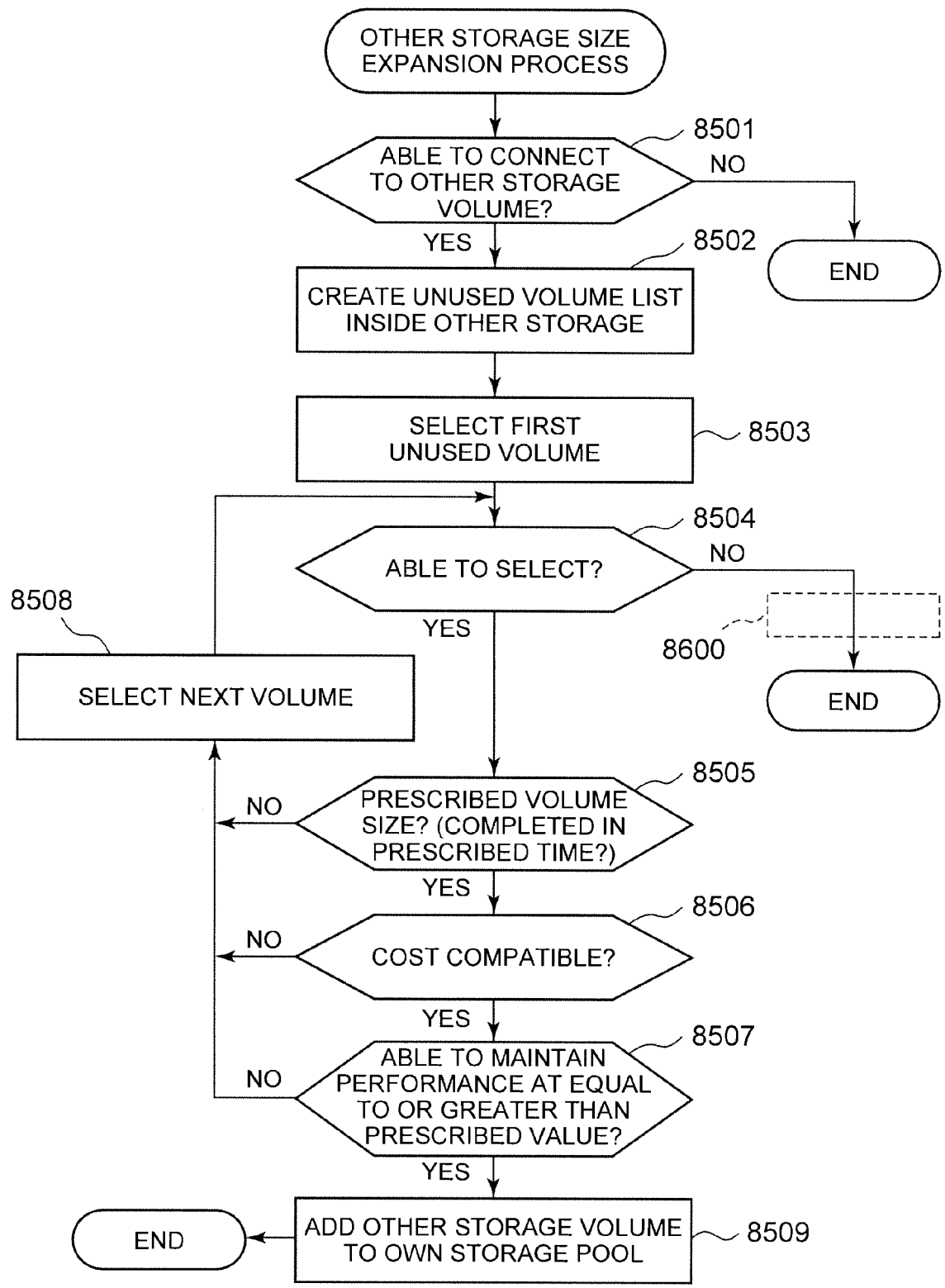
FIG. 12 is a flowchart showing a process for expanding the size of a pool using another storage.

FIG. 12 is a flowchart of a process that uses a logical volume of the other storage to expand the size of a pool of the own storage, and this processing is executed in S8209 of FIG. 9. In this processing, as will be described hereinbelow, a check is made as to whether or not it is possible to connect to the volume of the selected other storage (an external volume) from the own storage. In a case where connection is possible, the appropriateness of an unused volume of the volumes inside the selected other storage as the pool expansion volume from the points of volume size, cost category, and change in performance is evaluated. In a case where an unused external volume that has been assessed as appropriate exists, a connection is made from the own storage to this unused external volume, and the pool size is expanded by allocating this external volume to the pool inside the own storage.

First, the management computer 20 checks whether or not the own storage comprises a function (an external connection function) for connecting to a volume of the selected other storage (S8501). The external connection function 2133 of the storage information 213 may be referenced for this check.

In a case where the own storage does not comprise an external connection function (S8501: NO), this processing ends as an incomplete countermeasure. In a case where the own storage comprises an external connection function (S8501: YES), the following processing is carried out.

The management computer 20 creates a list of unused volumes inside the selected other storage (hereinafter, the candidate volume list) from the unused volume information 215 (S8502). Furthermore, the configuration may also be such that the candidate volume list is not created separately from the unused volume information 215 but rather the information on an unused candidate volume is read from the unused volume information 215. In this case, the management computer 20 selects only an unused volume inside the selected other storage in S8503 and S8508.

The management computer 20 selects one unused volume from the top of the candidate volume list (S8503). The management computer 20 determines whether or not it was possible to select an unused volume (S8504). In a case where a selectable unused volume does not exist (S8504: NO), this processing ends as an incomplete countermeasure.

In a case where it was possible to select an unused volume from inside the other storage (S8504: YES), the management computer 20 determines whether or not this unused volume is the prescribed size (S8505). That is, a check is carried out to make sure that the selected unused volume is an appropriate size for resolving the capacity shortage of the pool inside the own storage. Whether or not the unused volume is the prescribed size may be determined in accordance with the contents of the management policy information 216. This processing is the same as that of S8304 of FIG. 10. More specifically, the management computer 20 determines whether or not the size of the unused volume is the range needed to reach the goal.

In a case where the selected unused volume is not the prescribed size (S8505: NO), the management computer 20 selects the next unused volume from the candidate volume list (S8508) and returns to S8504.

In a case where the selected unused volume is the prescribed size (S8505: YES), the management computer 20 determines whether or not the cost category of the unused volume is compatible with the cost category of the allocation-destination pool (S8506). The specific processing is the same as that of S8305 of FIG. 10.

In a case where the cost category of the unused volume is not compatible with the cost category of the pool (S8506: NO), the management computer 20 moves to S8508.

In a case where the cost category of the unused volume is compatible with the cost category of the pool (S8506: YES), the management computer 20 evaluates the performance in a case where the unused volume has been added to the pool (S8507). The performance evaluation method is the same as that of S8306 of FIG. 10.

However, in the case of S8507, the external connection function is used to add the unused volume inside the other storage with respect to the pool inside the own storage. Therefore, access must be carried out from the own storage to the other storage, thereby giving rise to overhead. For this reason, the overhead portion may be compensated for. That is, in this processing, the overhead is taken into account to predict a change in the pool performance value. For example, it is possible to predict the pool performance by using a quantity of overhead that has been configured beforehand as a fixed value. Or, the configuration may be such that a function for measuring the amount of overhead is provided in the input/output processing program 3141 of the storage 30, and the pool performance is predicted based on a value measured in accordance therewith.

In a case where a determination has been made that this pool performance will be maintained even though the unused volume inside the other storage is added to the pool (S8507: YES), the selected unused volume is used to expand the pool size (S8509). This processing ends as a completed countermeasure. In a case where it was predicted that the drop in pool performance will be equal to or greater than an allowable value (S8507: NO), the management computer 20 moves to S8508.

Furthermore, a case in which a pool capacity shortage is dealt with by only adding one unused volume to the pool has been explained using the flowchart of FIG. 12. Instead of this, the configuration may be such that the pool capacity shortage is dealt with by adding multiple unused volumes to the pool.

In this case, for example, a determination is made in the size check of S8505 that satisfies the goal except in a case where this size exceeds a prescribed size (a prescribed size range). In addition, a list of unused volumes that pass the respective checks of S8506 and S8507 is created, and multiple unused volumes are selected from this list such that the total size of the unused volumes is within the required size range. It is also possible to expand the pool size by adding the selected multiple unused volumes to the pool.

Furthermore, the configuration may be such that an unused volume that does not reach the prescribed size is used to expand the pool size. In this case, multiple actions are carried out. Even in a case where an unused volume for realizing the targeted capacity usage is not obtained, the capacity usage of the pool can be lowered more than when an unused volume is not added to the pool. Therefore, it is possible to lower the risk of the pool capacity being depleted by adding an unused volume to the pool even when this unused volume is not of sufficient size.

The pool size expansion of the own storage by using an unused volume inside the other storage has been described using the flowchart of FIG. 12. Instead of this, the configuration may be such that a used logical volume that is allocated to the other pool is appropriated for expanding the size of the pool of the own storage.

Figure 13:
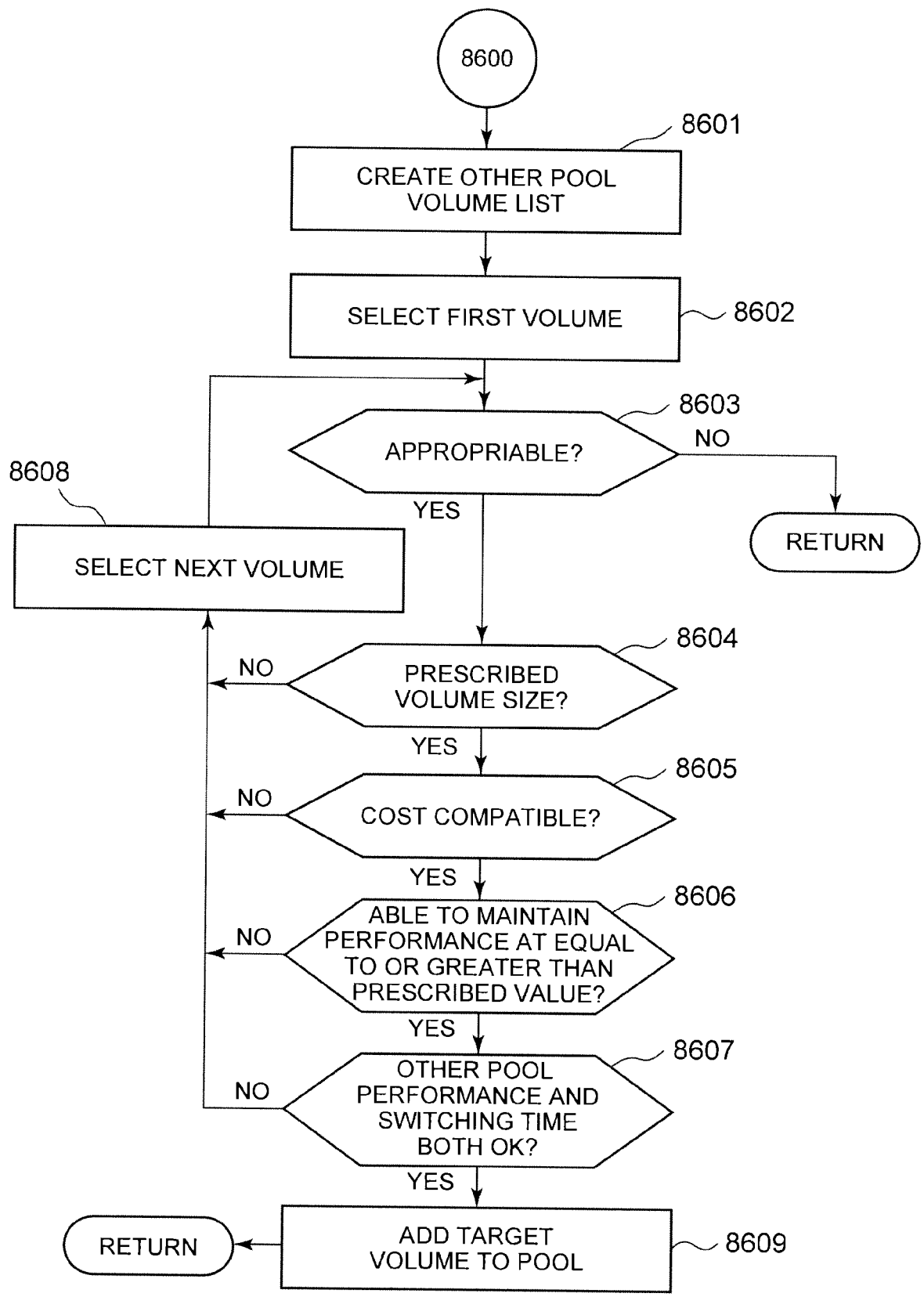
FIG. 13 is a flowchart showing a process for appropriating a volume that is being used in another pool to expand the pool size.

For this reason, the processing of S8600 described using FIG. 13 may be carried out subsequent to a determination of "NO" in S8504.

Furthermore, the present invention is not limited to the embodiment described hereinabove. A person having ordinary skill in the art will be able to make various additions and changes without departing from the scope of the present invention.

REFERENCE SIGNS LIST

10 Management terminal
20 Management computer
30 Storage
40 Host computer

The invention claimed is:

1. A computer system, comprising:
multiple storage control apparatuses configured to create at least one virtual logical volume;
at least one host computer configured to use the virtual logical volume; and
at least one management computer for managing the respective storage control apparatuses and the host computer,
wherein each of the storage control apparatuses is configured to allocate a real storage area of a real volume inside a pool to the virtual logical volume in response to a write access from the host computer, and to store write data received from the host computer in the allocated real storage area,
wherein the management computer comprises:
a microprocessor configured to read and execute a prescribed computer program;
a memory for storing the prescribed computer program; and
a communication interface part for communicating with the respective storage control apparatuses and the host computer,
wherein the microprocessor, by reading and executing the prescribed computer program, is configured to:
acquire a utilization status of each of the pools;
determine, based on the acquired utilization status of each of the pools, whether or not there exists a prescribed pool that requires pool size expansion;
when the prescribed pool is detected, select, based on a prescribed selection criterion, a volume addition method for adding an unused real volume to the prescribed pool; and
expand a pool size of the prescribed pool in accordance with the selected method.

2. A computer system according to claim 1, wherein the volume addition method comprises:

(A1) a first volume addition method, configured to add an unused first real volume of a prescribed storage control apparatus to which the prescribed pool belongs from among the respective storage control apparatuses to the prescribed pool;

(A2) a second volume addition method, configured to add an unused second real volume to the prescribed pool by connecting the unused second real volume of another storage control apparatus other than the prescribed storage control apparatus from among the respective storage control apparatuses to the prescribed storage control apparatus;

(A3) a third volume addition method, configured to remove a third real volume that is disposed in a first another pool of the prescribed storage control apparatus from among the respective storage control apparatuses, and add this removed third real volume to the prescribed pool as an unused real volume; and (A4) a fourth volume addition method, configured to remove a fourth real volume that is disposed in a second another pool of the other storage control apparatus other than the prescribed storage control apparatus, and add this removed fourth real volume to the prescribed pool as an unused real volume, wherein the microprocessor is configured to:

(C1) execute the first volume addition method when the prescribed selection criteria when the first volume addition method is to be executed indicate that the first real volume has a volume size enough to lower usage of the prescribed pool to equal to or less than prescribed usage, that an attribute label that is preconfigured with respect to the prescribed pool is compatible with an attribute label that is preconfigured with respect to the first real volume, and that response performance of the prescribed pool is equal to or greater than a prescribed pool performance value even in a case where the first real volume is added to the prescribed pool;

(C2) execute the second volume addition method when the prescribed selection criteria when the second volume addition method is to be executed indicate that the second real volume has a volume size enough to lower the usage of the prescribed pool to equal to or less than the prescribed usage, that the attribute label that is preconfigured with respect to the prescribed pool is compatible with an attribute label that is preconfigured with respect to the second real volume, and that the response performance of the prescribed pool is equal to or greater than the prescribed pool performance value even in a case where the second real volume is added to the prescribed pool;

(C3) execute the third volume addition method when the prescribed selection criteria when the third volume addition method is to be executed indicate that the third real volume has a volume size enough to lower the usage of the prescribed pool to equal to or less than the prescribed usage, that the attribute label that is preconfigured with respect to the prescribed pool is compatible with an attribute label that is preconfigured with respect to the third real volume, that the response performance of the prescribed pool is equal to or greater than the prescribed value even when the third real volume is added to the prescribed pool, and that response performance of the first other pool is equal to or greater than another pool performance value even though the third real volume is removed from the first other pool;

(C4) execute the fourth volume addition method when the prescribed selection criteria when the fourth volume addition method is to be executed indicate that the fourth real volume has a volume size enough to lower the usage of the prescribed pool to equal to or less than the prescribed usage, that the attribute label that is preconfigured with respect to the prescribed pool is compatible with an attribute label that is preconfigured with respect to the fourth real volume, and that the response performance of the prescribed pool is equal to or greater than the prescribed pool performance value even in a case where the fourth real volume is added to the prescribed pool;

wherein priority is configured in an order of (A1) the first volume addition method, (A2) the second volume addition method, (A3) the third volume addition method, and (A4) the fourth volume addition method, wherein the microprocessor is configured to execute the respective methods based on the priority.

3. A computer system according to claim 1, wherein the microprocessor, when the volume addition method is to be selected, is configured to take into account an operational status of an application program that uses the virtual logical volume to make a determination as to whether or not the pool size expansion of the prescribed pool is completed within a prescribed time.

4. A computer system according to claim 1, wherein the volume addition method comprises a first volume addition method, configured to add an unused first real volume of a prescribed storage control apparatus to which the prescribed pool belongs from among the respective storage control apparatuses to the prescribed pool.

5. A computer system according to claim 4, wherein the microprocessor is configured to take into account, as the prescribed selection criteria in a case where the first volume addition method is to be executed, a volume size of the first real volume, a state of compatibility between an attribute label that is preconfigured with respect to the prescribed pool and an attribute label that is preconfigured with respect to the first real volume, and response performance of the prescribed pool in a case where the first real volume is added to the prescribed pool.

6. A computer system according to claim 1, wherein the volume addition method comprises a second volume addition method, configured to add an unused second real volume to the prescribed pool by connecting the unused second real volume of another storage control apparatus other than the prescribed storage control apparatus from among the respective storage apparatuses to the prescribed storage pool.

7. A computer system according to claim 6, wherein the microprocessor is configured to take into account, as the prescribed selection criteria in a case where the second volume addition method is to be executed, a volume size of the second real volume, a state of compatibility between an attribute label that is preconfigured with respect to the prescribed pool and an attribute label that is preconfigured with respect to the second real volume, and response performance of the prescribed pool in a case where the second real volume is added to the prescribed pool.

8. A computer system according to claim 1, wherein the volume addition method comprises a third volume addition method, configured to: remove a third real volume that is disposed in a first another pool of a prescribed storage control apparatus from among the respective storage control apparatuses, and add this removed third real volume to the prescribed pool as an unused real volume.

9. A computer system according to claim 8, wherein the microprocessor is configured to take into account, as the prescribed selection criteria in a case where the third volume addition method is to be executed, a volume size of the third real volume, a state of compatibility between an attribute label that is preconfigured with respect to the prescribed pool and an attribute label that is preconfigured with respect to the third real volume, and response performance of the prescribed pool in a case where the third real volume is added to the prescribed pool.

10. A computer system according to claim 8, wherein the volume addition method comprises a fourth volume addition method, configured to: remove a fourth real volume that is disposed in a second another pool of another storage control apparatus other than the prescribed storage control apparatus, and add this removed fourth real volume to the prescribed pool as an unused real volume.

11. A computer system according to claim 10, wherein the microprocessor is configured to take into account, as the prescribed selection criteria in a case where the fourth volume addition method is to be executed, a volume size of the fourth real volume, a state of compatibility between an attribute label that is preconfigured with respect to the prescribed pool and an attribute label that is preconfigured with respect to the fourth real volume, and response performance of the prescribed pool in a case where the fourth real volume is added to the prescribed pool.

12. A method for managing a computer system, which comprises multiple storage control apparatuses that create at least one virtual logical volume, and at least one host computer that uses the virtual logical volume, wherein each of the storage control apparatuses is configured to allocate a real storage area of a real volume inside a pool to the virtual logical volume in response to a write access from the host computer, and to store write data received from the host computer in the allocated real storage area, the method comprising:

acquiring a utilization status of each of the pools;

determining, based on the acquired utilization status of each of the pools, whether or not there exists a prescribed pool that requires pool size expansion;

when the prescribed pool is detected, selecting, based on a prescribed selection criterion, a volume addition method for adding an unused real volume to the prescribed pool; and expanding a pool size of the prescribed pool in accordance with the selected method.

* * * * *